United States Patent [19]
Kato et al.

[11] Patent Number: 5,715,779
[45] Date of Patent: Feb. 10, 1998

[54] ABNORMALITY DETECTING APPARATUS FOR INTERNAL COMBUSTION ENGINE

[75] Inventors: Senji Kato, Aichi-ken; Tadashi Saito, Nisshin; Tadahisa Naganawa, Toyota; Kouji Endou, Mizunami; Nobuhisa Ohkawa, Toyota, all of Japan

[73] Assignee: Toyota Jidosha Kabushiki Kaisha, Toyota, Japan

[21] Appl. No.: 759,501

[22] Filed: Dec. 4, 1996

Related U.S. Application Data

[62] Division of Ser. No. 605,571, Feb. 22, 1996, Pat. No. 5,626,108.

[30] Foreign Application Priority Data

Feb. 27, 1995 [JP] Japan ................................ 7-038722
Mar. 8, 1995 [JP] Japan ................................ 7-048853

[51] Int. Cl.⁶ ............................................. F01L 13/00
[52] U.S. Cl. ............................. 123/90.15; 123/90.17
[58] Field of Search ........................ 123/90.15, 90.16, 123/90.17, 90.31

[56] References Cited

U.S. PATENT DOCUMENTS

| | | | |
|---|---|---|---|
| 4,996,954 | 3/1991 | Seki et al. | 123/90.17 |
| 5,103,780 | 4/1992 | Ishi | 123/90.15 |
| 5,363,817 | 11/1994 | Ikeda et al. | 123/90.15 |
| 5,522,352 | 6/1996 | Adachi et al. | 123/90.15 |
| 5,529,031 | 6/1996 | Yoshioka | 123/90.15 |
| 5,529,034 | 6/1996 | Sone et al. | 123/90.15 |

FOREIGN PATENT DOCUMENTS 59-105911  6/1984  Japan.

OTHER PUBLICATIONS

Patent Abstracts of Japan, vol. 18, No. 640 (M–1717), 6 Dec. 1994 & JP-A-06-248986 (Toyota Motor Corporation).
Patent Abstracts of Japan, vol. 8, No. 224 (M–331), 13 Oct. 19894 & JP-A-59-105911 (Toyota Jidosha KK).

*Primary Examiner*—Weilun Lo
*Attorney, Agent, or Firm*—Kenyon & Kenyon

[57] ABSTRACT

In detecting the occurrence of an abnormality in a variable valve timing mechanism, which continuously changes a valve timing by advancing or delaying the displacement angle of an intake-side cam shaft with respect to a crankshaft, an abnormality detecting apparatus for a valve timing control apparatus determines that the variable valve timing mechanism is failing when the absolute value of the difference between a target displacement angle and a correct real displacement angle, obtained by subtracting the maximum delay-angle learning value from the real displacement angle, is greater than a first predetermined value and the absolute value of the difference between a correct real displacement angle and a previous correct real displacement angle is equal to or smaller than a second predetermined value.

4 Claims, 13 Drawing Sheets

ABNORMALITY DETECTING APPARATUS FOR INTERNAL COMBUSTION ENGINE

This is a division of application Ser. No. 08/605,571 filed 22 Feb. 1996, now U.S. Pat. No. 5,626,108.

BACKGROUND OF THE INVENTION

1. Field of the Invention

The present invention relates generally to an abnormality detecting apparatus for use in a valve timing control apparatus for an internal combustion engine, which controls the valve timing of either the intake valve or the exhaust valve of the internal combustion engine in accordance with the running conditions of the engine. More particularly, this invention relates to an abnormality detecting apparatus that is used for an internal combustion engine with a variable valve timing mechanism and detects an abnormality in a displacement angle of the cam shaft with respect to the crankshaft.

2. Description of the Related Art

Variable valve timing mechanisms have been put into practice, which alter the valve timing of either the intake valve or the exhaust valve in accordance with the running conditions of the engine. One known variable valve timing mechanism of this type continuously varies the rotational phase difference (displacement angle) of the cam shaft with respect to the crankshaft.

Engines having a variable valve timing mechanism perform such feedback control as to converge the real rotational phase difference (real displacement angle) to the target rotational phase difference (target displacement angle) that is determined based on the running conditions of the engines. It is therefore necessary to accurately detect the real displacement angle using a phase difference detecting apparatus as described in Japanese Unexamined Patent Publication No. Sho 59-105911.

This publication discloses an apparatus that accurately detects the real displacement angle by measuring the interval between a first pulse signal output for each rotation of the crankshaft and a second pulse signal output for each rotation of the cam shaft. Engines with such a variable valve timing mechanism have inherent problems originating from the variable valve timing mechanism.

The first problem is that when the variable valve timing mechanism fails due to the entrance of some foreign matter or the like, the real displacement angle cannot be converged to the target displacement angle. If various control amounts such as the fuel injection timing are so determined as to be associated with the target displacement angle, the output characteristic of the engine will be poor. It is therefore necessary to determine whether or not a failure has occurred in the variable valve timing mechanism and correct various control amounts, if such has occurred, to prevent the output characteristic of the engine from deteriorating.

In this respect, typical failure detectors have been proposed that determine that the variable valve timing mechanism has failed when the absolute value of the difference between the target displacement angle and the real displacement angle is greater than a predetermined threshold value. However, an erroneous failure detection is apt to occur if it is determined that the variable valve timing mechanism has failed when the absolute value of the difference between the target displacement angle and the real displacement angle is greater than a predetermined threshold value. This is because the absolute value of the difference between the target displacement angle and the real displacement angle is generally large at the initial stage of the control of changing the real displacement angle toward the determined target displacement angle. If the threshold value for the determination of a failure is set small, it is frequently determined that the variable valve timing mechanism has failed. If this threshold value is set large, on the other hand, it is not possible to execute the effective failure determination.

If the target displacement angle is the maximum advance angle or lies near the maximum delay angle, the real displacement angle may stop changing even when it is smaller or greater than the target displacement angle. In other words, because the allowable operational ranges of variable valve timing mechanisms differ from one mechanism to another due to the allowances for constituting components, the real displacement angle may physically become the maximum shifted state (where the constituting components abut on one another) before reaching the maximum or target displacement angle, so that the real displacement angle does not converge to the target displacement angle. When the threshold value used for failure determination is constant, therefore, the occurrence of a failure may be erroneously determined even if the real displacement angle is changed to the maximum level from the viewpoint of the variable valve timing mechanism.

If the determination of the proper recovery from a failure in the variable valve timing mechanism is executed when the absolute value of the difference between the target displacement angle and the real displacement angle becomes smaller than the threshold value for failure determination, the proper recovery may be erroneously determined. As the target displacement angle varies with time in accordance with the running conditions of the engine, the absolute value of the difference between the target displacement angle and the real displacement angle also varies.

The absolute value of the computed difference merely indicates the transient operational condition of the variable valve timing mechanism, not the steady operational condition thereof. Accordingly, the variable valve timing mechanism may be determined to have recovered properly in some cases even if it is still in a failure state from the steady viewpoint.

If failure determination and the determination of the proper recovery are executed in a normal decision time when the response characteristic of the variable valve timing mechanism is poor, those determinations may result in error. With regard to a variable valve timing mechanism that is driven hydraulically, for example, the operational resistance is high when the oil viscosity is low. A longer time is needed in this case for the real displacement angle to converge to the target displacement angle than in the case of the normal oil viscosity. If the time for failure determination is set based on the normal oil viscosity, therefore, the variable valve timing mechanism may be determined to be in a failure state even though the real displacement angle is varying toward the target displacement angle.

The second problem is a variation in the engine characteristics, which is caused by the shifting of the displacement angle of the cam shaft with respect to the crankshaft due to the improper setting of the timing belt or the like. More specifically, even when the valve timing is changed by altering the displacement angle by the variable valve timing mechanism, a predetermined valve timing cannot be established and the desired engine characteristics cannot be acquired.

Generally, various control timings for engines are determined on the basis of the rotational angle of the crankshaft (crank angle), so are the opening/closing timings of the intake valve and exhaust valve. Many intake valves and exhaust valves are so driven by the cam shaft as to accomplish predetermined opening and closing timings. This cam shaft is driven by the crankshaft with a transmission member such as the timing belt or timing chain.

If the displacement angle of the cam shaft with respect to the crankshaft shifts from the predetermined displacement angle because of the improper teeth engagement of the timing belt, the improper setting of the timing belt or the like, the intake valve and exhaust valve cannot be opened or closed at the predetermined opening/closing timings, thus deteriorating the engine output characteristics.

In view of the above situation, a timing failure detecting apparatus has been proposed that normally determines if the displacement of the angle (timing) of the cam shaft (the displacement angle) with respect to the crankshaft lies within a predetermined range based on the crank angle detected by the crank angle sensor and the cam angle detected by the cam angle sensor. This detecting apparatus always detects the displacement angle of the cam shaft with respect to the crankshaft and detects a timing failure when the displacement angle comes off the predetermined range.

The shifting of the displacement angle of the cam shaft with respect to the crankshaft, which is caused by the improper setting of the timing belt or the like, is not inherent merely to engines having a variable valve timing mechanism. However, engines having a variable valve timing mechanism achieve the optimal valve timing that varies according to the engine condition, by changing the displacement angle of the cam shaft with respect to the crankshaft.

While the cam shaft is changing toward the target displacement angle, the displacement angle of the cam shaft with respect to the crankshaft is continuously changing and never stays at a constant value. Consequently, if a failure is determined by checking whether the displacement angle lies within a given threshold value as is done for ordinary engines, there is a possibility of erroneous detection. Even in the case where a failure is detected after the cam shaft reaches the target displacement angle, an abnormal displacement angle cannot be detected using a threshold value of "1" because the cam shaft can take various target displacement angles.

One may think that a predetermined value as the threshold value for failure determination should be changed for each target displacement angle so that the timing failure would be determined based on such a variable threshold value. In changing the cam shaft toward the target displacement angle, the real displacement angle may not match with the target displacement angle because of the response delay of the cam shaft. If it is determined whether or not the displacement angle lies below a predetermined threshold value for failure determination while changing this predetermined value simply for each target displacement angle, it is likely that a failure is erroneously detected even though no failure has actually occurred in the displacement angle.

SUMMARY OF THE INVENTION

Accordingly, it is a primary objective of the present invention to avoid an erroneous determination that a variable valve timing mechanism is failing simply because the absolute value of the difference between the target valve timing and the real valve timing is large.

It is a secondary objective of this invention to prevent erroneous determinations that a variable valve timing mechanism is failing due to the physical restriction of the variable valve timing mechanism even if the real valve timing is at the maximum shifted valve timing.

It is a third objective of this invention to prevent the state of a variable valve timing mechanism from being erroneously determined as being properly recovered when the absolute value of the difference between the target valve timing and the real valve timing transiently becomes equal to or greater than a first predetermined value even though the variable valve timing mechanism is failing.

It is a fourth objective of this invention to prevent the chattering in various controls which are influenced by failure determination on a variable valve timing mechanism.

It is a fifth objective of this invention to positively prevent erroneous determinations that a variable valve timing mechanism is failing under conditions where the operation of the variable valve timing mechanism is unstable.

It is a sixth objective of this invention to prevent an abnormality of the displacement angle of the cam shaft with respect to the crankshaft from being erroneously detected even when the generation timing of a displacement timing signal is changed in accordance with a positional change in the crankshaft on the side where a variable valve timing mechanism is located.

To achieve the foregoing and other objects and in accordance with a first aspect of the present invention, an abnormality detecting apparatus for detecting an abnormality of an internal combustion engine is provided. The engine includes a crankshaft, an intake port, a corresponding intake valve, an exhaust port, and a corresponding exhaust valve. The valves are driven in a predetermined timing relationship with respect to the crankshaft. The intake valve and exhaust valve selectively open or close the intake port and exhaust port, respectively, and the valve timing of at least one of the intake valve and exhaust valve is altered by a variable valve timing mechanism. The abnormality detecting apparatus includes means for detecting running conditions of the internal combustion engine, means for determining a target valve timing of the valve altered by the variable valve timing mechanism in accordance with the running conditions of the engine, means for detecting a real valve timing of the valve altered by the variable valve timing mechanism, means for controlling the variable valve timing mechanism to change the valve timing of the valve to be altered to converge the detected real valve timing to the determined target valve timing, and means for detecting generation of abnormality in the variable valve timing mechanism. The abnormality generation detecting means decides that an abnormality has been generated in the variable valve timing mechanism when the absolute difference between the determined target valve timing and detected real valve timing is at least a first predetermined value and an amount of change in the detected real valve timing over a predetermined time is at most a second predetermined value.

According to another aspect of the invention, an abnormality detecting apparatus for detecting an abnormality of an internal combustion engine is disclosed. The engine includes a crankshaft, an intake port, a corresponding intake valve, an exhaust port, and a corresponding exhaust valve. The valves are driven in a predetermined timing relationship with respect to the crankshaft. The intake valve and exhaust valve selectively open or close the intake port and exhaust port, respectively, and the valve timing of at least one of the intake valve and exhaust valve is altered by a variable valve timing mechanism. The abnormality detecting apparatus includes means for detecting running conditions of the internal combustion engine, an intake cam shaft rotated by the transferring rotational movement means in a predetermined timing relationship with the rotation of the crankshaft, an exhaust cam shaft rotated by the transferring rotational movement means in a predetermined timing relationship with the rotation of the crankshaft, means for generating a reference timing signal at predetermined crank angle intervals with rotation of the crankshaft, means for deciding a target displacement angle of the cam shaft controlled by the variable valve timing mechanism in accordance with the engine conditions, means for generating an alter timing signal with regard to a real displacement angle of rotation of the cam shaft controlled by the variable valve timing mechanism, means for computing the real displacement angle of the controlled cam shaft with respect to the crankshaft, means for controlling the variable valve timing mechanism to converge the computed real displacement angle to the determined target displacement angle, means for computing an alter amount of the displacement angle based on the computed real displacement angle and the reference displacement angle of the variable valve timing mechanism, means for deciding whether the displacement angle of the controlled cam shaft is held at the predetermined target displacement angle, and second means for detecting generation of an abnormality in the engine. The intake cam shaft drives the intake valve. The exhaust cam shaft drives the exhaust valve. At least one of the cam shafts is controlled by the variable valve timing mechanism. The variable valve timing mechanism shifts a displacement angle of the controlled cam shaft with respect to the crankshaft from a reference displacement angle to the target displacement angle so that the valve timing changes from a reference timing to a target timing. The displacement angle computing means computes the real displacement angle based on the generated reference timing signal and generated alter timing signal. The second abnormality generation detecting means decides that an abnormality has been generated in the engine when the means for deciding whether the displacement angle is held decides that the displacement angle of the controlled cam shaft remained at the target displacement angle and an absolute difference between the computed real displacement angle and computed alter amount of displacement angle is at least a fourth predetermined value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

Figure 1:
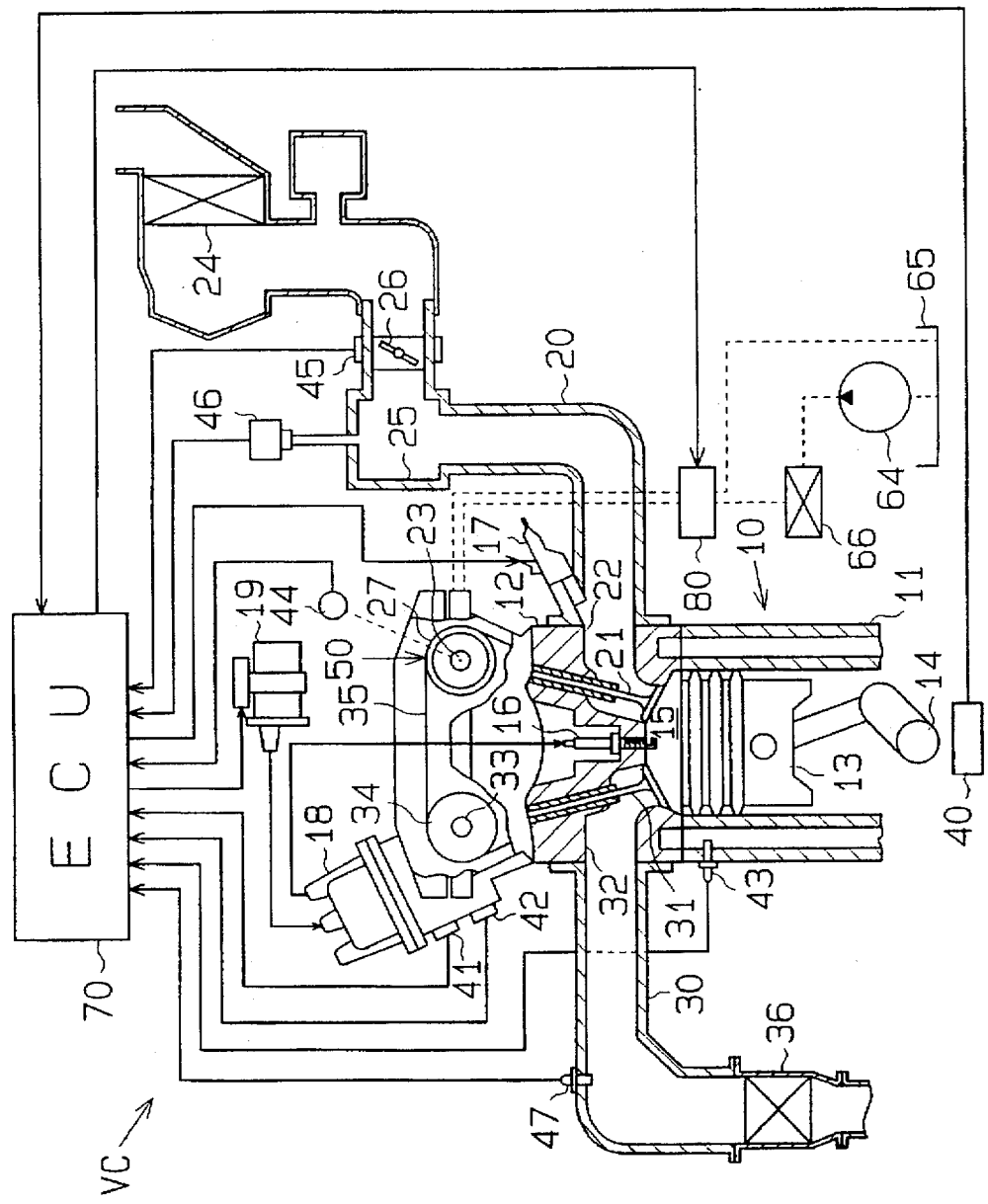
FIG. 1 is a diagram schematically illustrating the schematic structure of a gasoline engine system for which this invention is adapted.
Figure 2:
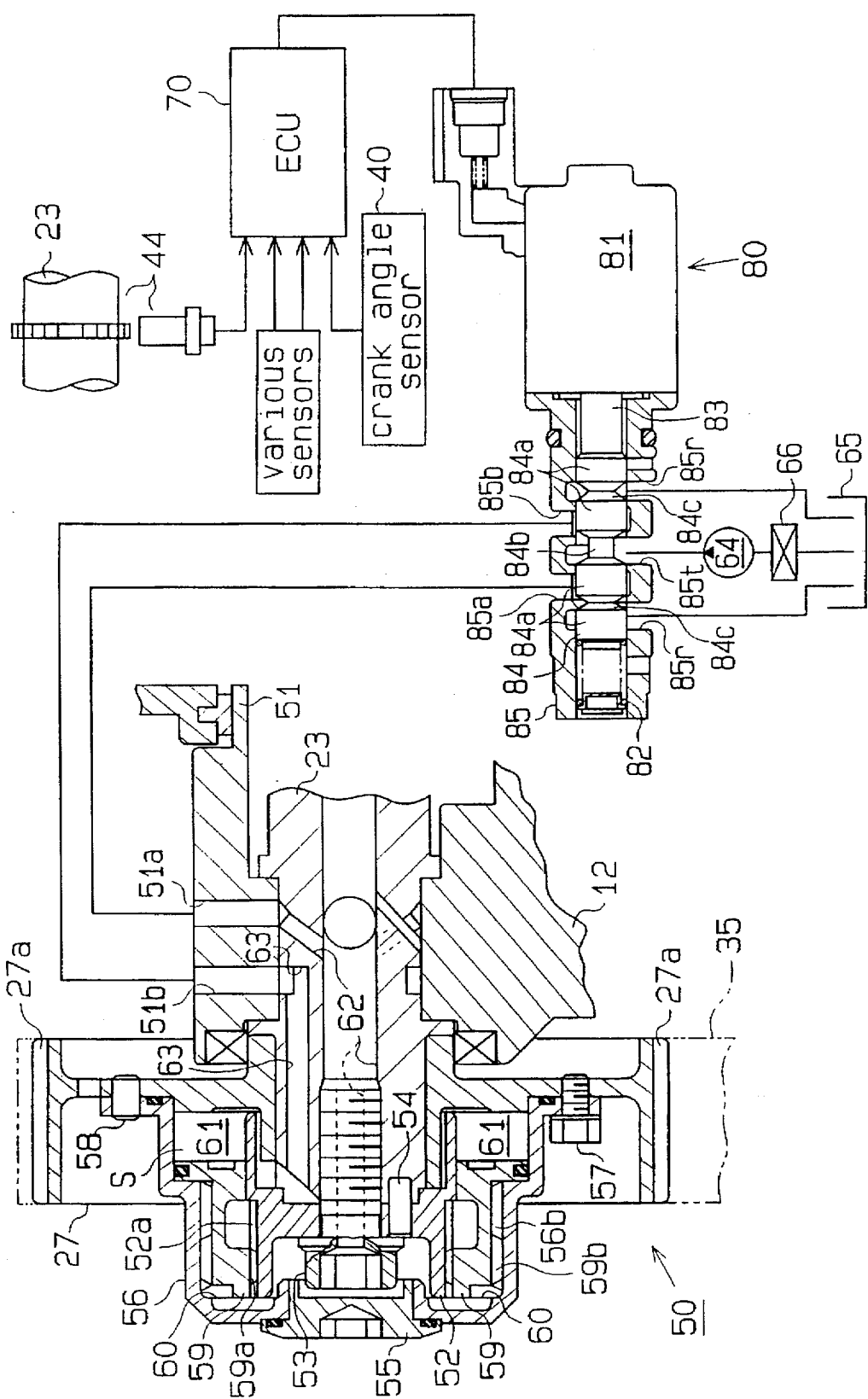
FIG. 2 is a diagram schematically showing the structure of a variable valve timing mechanism.

The structure of an abnormality detecting apparatus VC for a valve timing control apparatus according to the first embodiment will be now described with reference to FIGS. 1 and 2. FIG. 1 schematically shows the structure of a gasoline engine system including an abnormality detecting apparatus VC for a valve timing control apparatus.

An internal combustion engine 10 includes a cylinder block 11 having a plurality of cylinders, a cylinder head 12 coupled to the top of the cylinder block 11, and pistons 13, which reciprocate in the associated cylinders in the cylinder block 11. A crankshaft 14 is coupled to the pistons 13 so that as the pistons 13 move up and down, the crankshaft 14 rotates.

Provided near the crankshaft 14 is a crank angle sensor 40 which comprises a magnetic rotor (not shown) coupled to the crankshaft 14 and an electromagnetic pickup (not shown). Equiangular teeth are formed on the outer surface of the rotor, so that a pulse-like crank angle signal is detected every time the equiangular teeth pass in front of the electromagnetic pickup.

After a reference position signal is produced by a timing sensor 42, which will be discussed later, the rotational angle (crank angle) of the crankshaft 14 is detected by measuring the number of crank angle signals generated from the crank angle sensor 40.

The space defined by the cylinder block 11, the inner wall of the cylinder head 12 and the top of each piston 13 serves as a combustion chamber 15 for burning an air-fuel mixture. Ignition plugs 16 for igniting the air-fuel mixture are arranged at the top of the cylinder head 12 to protrude inside the combustion chamber 15.

A distributor 18 is provided in the vicinity of a cam shaft 33 on the exhaust side of the cylinder head 12. The cam shaft 33 is coupled to the distributor 18 on which an engine speed sensor 41 for detecting the number of rotations of the crankshaft 14 and the aforementioned timing sensor 42 for detecting the reference position signal to be generated at a given timing are provided.

The engine speed sensor 41 comprises a magnetic rotor (not shown), which rotates in synchronism with the crankshaft 14, and an electromagnetic pickup (not shown). After the reference position signal is produced by the timing sensor 42, an engine speed NE (rotational speed of the crankshaft 14) is detected by measuring the number of generated pulses.

The individual ignition plugs 16 are coupled to the distributor 18 via plug cords or the like (not shown), so that the distributor 18 distributes high voltage output from igniters 19 to the individual ignition plugs 16 in a predetermined relationship with the crank angle.

Provided at the cylinder block 11 is a coolant temperature sensor 43 for detecting the temperature (coolant temperature) THW of the coolant flowing through a coolant passage. The cylinder head 12 has air-intake ports 22 connected to an air-intake passage 20, and exhaust ports 32 connected to an exhaust passage 30. An intake valve 21 is located at each air-intake port 22 and an exhaust valve 31 at each exhaust port 32.

An intake-side cam shaft 23 for opening and closing the intake valves 21 is located above the intake valves 21, and the exhaust-side cam shaft 33 for opening and closing the exhaust valves 31 is located above the exhaust valves 31. An intake-side timing pulley 27 is mounted on one end of the cam shaft 23, and an exhaust-side timing pulley 34 is mounted on one end of the cam shaft 33, both timing pulleys 27 and 34 being coupled with a timing belt 35 to the crankshaft 14.

When the engine 10 is running, torque is transmitted to the individual cam shafts 23 and 33 with the timing belt 35 and the timing pulleys 27 and 34 from the crankshaft 14 to rotate the cam shafts 23 and 33. As the cam shafts 23 and 33 rotate, the intake valves 21 and the exhaust valves 31 are opened or closed. Those valves 21 and 31 are driven at predetermined opening and closing timings with respect to the rotation of the crankshaft 14 and the up and down movements of the individual pistons 13, i.e., in a predetermined relationship with a sequence of four strokes of the engine 10, the suction stroke, compression stroke, combustion stroke and exhaust stroke.

Provided near the intake-side cam shaft 23 is a cam angle sensor 44 for detecting the valve timings of the intake valves 21. This cam angle sensor 44 comprises a magnetic rotor (not shown) coupled to the intake-side cam shaft 23 and an electromagnetic pickup (not shown). A plurality of teeth are formed at equiangular distances on the outer surface of the magnetic rotor, so that a pulse-like cam angle signal produced according to the rotation of the intake-side cam shaft 23 is detected before the compression TDC of a given cylinder between BTDC 90 degrees to 30 degrees.

An air cleaner 24 is connected to the air-inlet side of the air-intake passage 20, and a throttle valve 26, which is opened or closed in response to an acceleration pedal (not shown), is located midway in the air-intake passage 20. As the acceleration pedal is manipulated, the amount of intake air is adjusted.

Provided near the throttle valve 26 is a throttle sensor 45 for detecting a throttle angle TA. A surge tank 25 for suppressing the pulsation of intake air is formed downstream of the throttle valve 26. Located in the surge tank 25 is a manifold pressure sensor 46, which detects the manifold pressure in the surge tank 25. Injectors 17 for supplying fuel to the combustion chambers 15 are provided near the air-intake ports 22 of the individual cylinders. Each injector 17 is an electromagnetic valve, which is opened when energized and is supplied with compressed fuel from a fuel pump (not shown).

When the engine 10 is running, the air filtered by the air cleaner 24 is supplied into the air-intake passage 20, and fuel is injected to the air-intake ports 22 from the individual injectors 17 at the same time as the air is supplies. Consequently, an air-fuel mixture is produced at each air-intake port 22 and this air-fuel mixture is supplied into the associated combustion chamber 15 as the associated intake valve 21 is opened in the suction stroke.

A catalytic converter 36 including rhodium for cleaning the exhaust gas is located midway in the exhaust passage 30. An oxygen sensor 47 for detecting the oxygen density of the exhaust gas is located midway in the exhaust passage 30.

To alter the amount of valve overlap by changing the opening/closing timing of each intake valve 21, a variable valve timing mechanism (hereinafter called "VVT") 50 which is driven hydraulically, is provided. This VVT 50 alters the rotational phase of the intake-side cam shaft 23 with respect to the rotation of the crankshaft 14 (intake-side timing pulley 27) to continuously alter the valve timing of the intake valves 21. The VVT 50 will now be discussed with reference to FIG. 2, which is an explanatory diagram showing a cross section of the portion around the intake-side cam shaft 23 where the VVT 50 is located and the entire control system for the VVT 50. The control system for the VVT 50 has an oil control valve (hereinafter called "OCV") 80 for applying driving force to the VVT 50, the cam angle sensor 44 for detecting a cam angle signal, and an ECU (Electronic Control Unit) 70 for controlling the driving of the OCV 80 based on input signals from various sensors, such as the cam angle sensor 44.

The VVT 50 is located between the intake-side cam shaft 23 and the intake-side timing pulley 27; the cam shaft 23 is rotatably supported between the cylinder head 12 and a bearing cap 51. The intake-side timing pulley 27 is attached to the vicinity of the distal end portion of the intake-side cam shaft 23 in a relatively rotatable manner, and an inner cap 52 is attached to the distal end of the intake-side cam shaft 23 by a hollow bolt 53 and a pin 54 to be rotatable integrally with the cam shaft 23.

A housing 56 having a cap 55 is attached to the intake-side timing pulley 27 by a bolt 57 and a pin 58 in such a way as to be rotatable together with the timing pulley 27. This housing 56 covers the distal end of the intake-side cam shaft 23 and the entire inner cap 52. Formed on the outer surface of the intake-side timing pulley 27 are multiple outer teeth 27a with which the timing belt 35 is engaged.

The intake-side cam shaft 23 and intake-side timing pulley 27 are coupled by a ring gear 59 located between the housing 56 and the inner cap 52. The ring gear 59 having an approximately ring shape is retained in space S, defined by the intake-side timing pulley 27, housing 56 and inner cap 52, in such a way as to be reciprocatable in the axial direction of the intake-side cam shaft 23. Multiple teeth 59a and 59b are formed on the inner and outer surfaces of the ring gear 59. In association with the teeth 59a and 59b, multiple teeth 52a and 56b are formed on the outer surfaces of the inner cap 52 and the inner surfaces of the housing 56, respectively. Each of the teeth 59a, 59b, 52a and 56b is a helical tooth whose trace intersects the axial line of the intake-side cam shaft 23 at a given angle. That is, the teeth 52a engage with the teeth 59a, and the teeth 56b engage with the teeth 59b, thus constituting a helical spline.

The gear engagement allows the rotation of the intake-side timing pulley 27 to be transmitted to the intake-side cam shaft 23 via the housing 56 and inner cap 52. Because the teeth 59a, 59b, 52a and 56b are helical teeth, as the ring gear 59 moves in the axial direction of the intake-side cam shaft 23, a twisting force is applied to the inner cap 52 and housing 56. Consequently, the intake-side cam shaft 23 moves relative to the intake-side timing pulley 27.

The space S has a first hydraulic chamber 60 on the distal end side of the ring gear 59 and a second hydraulic chamber 61 on the proximal end side of the ring gear 59 in order to move the ring gear 59 in the axial direction. The bearing cap 51 has a first hydraulic pressure supply hole 51a and a second hydraulic pressure supply hole 51b. Formed in the intake-side cam shaft 23 are a first hydraulic pressure supply passage 62, which communicates with the first hydraulic pressure supply hole 51a and the first hydraulic chamber 60, and a second hydraulic pressure supply passage 63, which communicates with the second hydraulic pressure supply hole 51b and the second hydraulic chamber 61.

Lubricating oil pumped up from an oil pan 65 by a hydraulic pump 64 is supplied via an oil filter 66 to the individual hydraulic pressure supply holes 51a and 51b under a predetermined pressure. To selectively supply the hydraulic pressure to the hydraulic chambers 60 and 61 via the hydraulic pressure supply passages 62 and 63, the OCV 80 is connected to the hydraulic pressure supply holes 51a and 51b. The OCV 80 is a 4-port direction control valve that changes the flow direction of the lubricating oil as a plunger 83, which is driven by an electromagnetic actuator 81 and a coil spring 82, reciprocates a spool 84 in the axial direction. The duty ratio of the electromagnetic actuator 81 is controlled to adjust the angle of the actuator 81 thereby adjusting the level of the hydraulic pressures to be supplied to the individual hydraulic chambers 60 and 61.

The casing, 85, of the OCV 80 has a tank port 85t, an A port 85a, a B port 85b and reservoir ports 85r. The tank port 85t is connected via the hydraulic pump 64 to the oil pan 65, the A port 85a to the first hydraulic pressure supply hole 51a, and the B port 85b to the second hydraulic pressure supply hole 51b. The reservoir ports 85r are connected to the oil pan 65. The spool 84 is a cylindrical valve body, which has four lands 84a for blocking the flow of the lubricating oil between two ports, and one passage 84b and two passages 84c for communicating two ports and allowing the flow of the lubricating oil.

When the OCV 80 in the VVT 50 is controlled to move the spool 84 leftward in the diagram, the passage 84b connects the tank port 85t to the A port 85a to supply the lubricating oil to the first hydraulic pressure supply hole 51a. The lubricating oil supplied to the first hydraulic pressure supply hole 51a is supplied via the first hydraulic pressure supply passage 62 to the first hydraulic chamber 60 to apply hydraulic pressure to the distal end of the ring gear 59. At the same time, one of the passages 84c connects the B port 85b to the associated reservoir port 85r so that the lubricating oil in the second hydraulic chamber 61 is discharged to the oil pan 65 via the second hydraulic pressure supply passage 63, the second hydraulic pressure supply hole 51b, and the B port 85b and the associated reservoir port 85r of the OCV 80.

Accordingly, the ring gear 59 is moved toward the proximal end (rightward in the diagram), while rotating, by hydraulic pressure applied to the distal end side to thereby twist the intake-side cam shaft 23 via the inner cap 52. As a result, the rotational phase of the intake-side cam shaft 23 with respect to the intake-side timing pulley 27 (crankshaft 14) is changed, so that this cam shaft 23 rotates toward the maximum advance-angle position from the maximum delay-angle position to advance the valve opening timing of each intake valve 21. The intake valve 21 with the advanced timing is opened while the associated exhaust valve 31 is opened, increasing the valve overlap period in which the intake valve 21 and the exhaust valve 31 are opened simultaneously. The movement of the ring gear 59 toward the proximal end is restricted by the abutment of the ring gear 59 on the intake-side timing pulley 27. When the ring gear 59 abuts on this timing pulley 27 and stops, the valve opening timing of the intake valve 21 is advanced to the maximum degree.

When the OCV 80 is controlled to move the spool 84 rightward in the diagram, the passage 84b connects the tank port 85t to the B port 85b to supply the lubricating oil to the second hydraulic pressure supply hole 51b. The lubricating oil supplied to the second hydraulic pressure supply hole 51b is supplied via the second hydraulic pressure supply passage 63 to the second hydraulic chamber 61 to apply hydraulic pressure to the proximal end of the ring gear 59. At the same time, one of the passages 84c connects the A port 85a to the associated reservoir port 85r so that the lubricating oil in the first hydraulic chamber 60 is discharged to the oil pan 65 via the first hydraulic pressure supply passage 62, the first hydraulic pressure supply hole 51a, and the A port 85a and the associated reservoir port 85r of the OCV 80.

Accordingly, the ring gear 59 is moved toward the distal end (leftward in the diagram), while rotating, by the hydraulic pressure applied to the proximal end side to thereby apply the opposite twisting to the intake-side cam shaft 23 via the inner cap 52. As a result, the rotational phase of the intake-side cam shaft 23 with respect to the intake-side timing pulley 27 (crankshaft 14) is changed, so that this cam shaft 23 rotates toward the maximum delay-angle position from the maximum advance-angle position to delay the valve opening timing of each intake valve 21. As the valve opening timing of each intake valve 21 is delayed, the valve overlap period in which the intake valve 21 and the associated exhaust valve 31 are opened simultaneously is reduced or canceled. The movement of the ring gear 59 toward the distal end is restricted by the abutment of the ring gear 59 on the housing 56. Thus, when the ring gear 59 abuts on the housing 56 and stops, the valve opening timing of the intake valve 21 is delayed to the maximum degree.

The valve timing of the intake valve 21 to be changed by the VVT 50 is computed from the cam angle signal output from the cam angle sensor 44 and the crank angle signal output from the crank angle sensor 40. For example, the time from the input of the cam angle signal (displacement timing signal) to the ECU 70 to the input of the crank angle signal (reference timing signal) of BTDC 30 degrees is measured using the engine speed NE and this time is converted to the displacement angle using the relationship between a known time and the crank angle to compute the actual displacement angle VTB of the intake-side cam shaft 23 with respect to the crankshaft 14.

Figure 3:
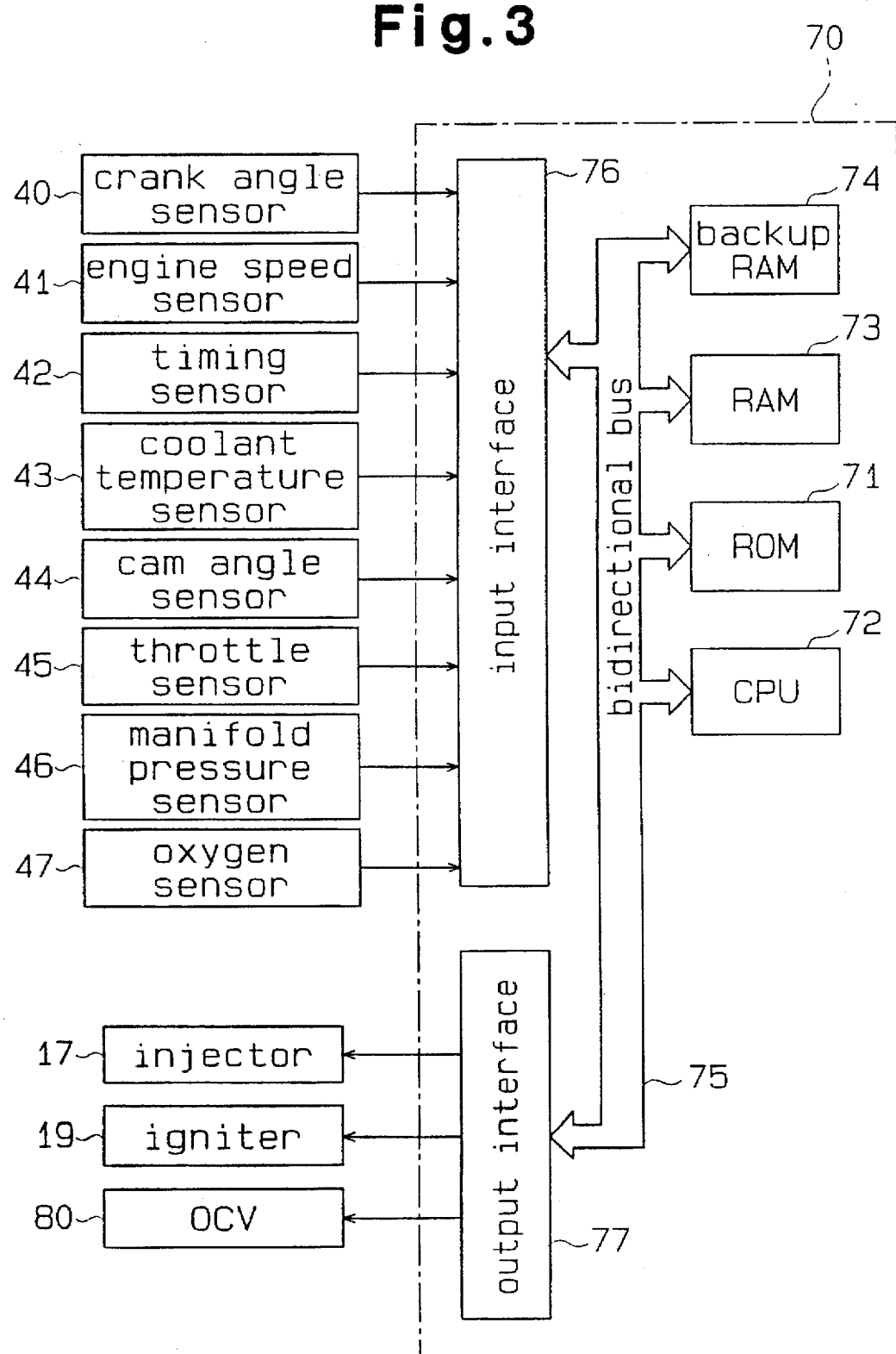
FIG. 3 is a control block diagram of an abnormality detecting apparatus for a valve timing control apparatus.

A description will be now given of the control system of the abnormality detecting apparatus VC for a valve timing control apparatus, with reference to the control block diagram shown in FIG. 3. The control system of the abnormality detecting apparatus VC for a valve timing control apparatus according to this embodiment is comprised mainly of the ECU 70. The ECU 70 has a ROM 71 storing an abnormality/proper-recovery determining program for determining the abnormality and proper recovery of the VVT 50, which is executed as the main routine, and a map for changing the valve timing according to various conditions. The ROM 71 also holds various control programs such as a first failure determining program, a proper-recovery determining program and a start condition determining program, which are executed as subroutines.

The ECU 70 further has a CPU 72, which executes operations based on the control programs stored in the ROM 71, a RAM 73 for temporary storage of the results of the operations performed by the CPU 72 and data or the like sent from various sensors, and a backup RAM 74 for holding various kinds of data stored in the RAM 73 when the power supply is stopped. The CPU 72, ROM 71, RAM 73 and backup RAM 74 are connected together via a bidirectional bus 75, and are also connected to an input interface 76 and an output interface 77.

Connected to the input interface 76 are the crank angle sensor 40, the engine speed sensor 41, the timing sensor 42, the coolant temperature sensor 43, the cam angle sensor 44, the throttle sensor 45, the manifold pressure sensor 46, and the oxygen sensor 47, etc. When the signals sent from the various sensors are analog signals, those signals are converted to digital signals by an unillustrated A/D converter before being sent on the bidirectional bus 75. Connected to the output interface 77 are external circuits, such as the injectors 17, the igniters 19 and the OCV 80, the operations of which are controlled based on the results of the operations which are performed by various control programs run by the CPU 72.

A description will now be given of the abnormality/proper-recovery determining program, which is executed by the thus constituted abnormality detecting apparatus VC for a valve timing control apparatus according to the first embodiment, with reference to the flowcharts illustrated in FIGS. 4 to 9.

The abnormality/proper-recovery determining program has, as subroutines, a failure determining program for determining if a failure (abnormality) has occurred in the VVT 50 and a proper-recovery determining program for determining if the failed VVT 50 has returned to the proper state. The ECU 70 executes the abnormality/proper-recovery determining program every 240 degrees CA (crank angle) while the engine 10 is running.

Figure 4:
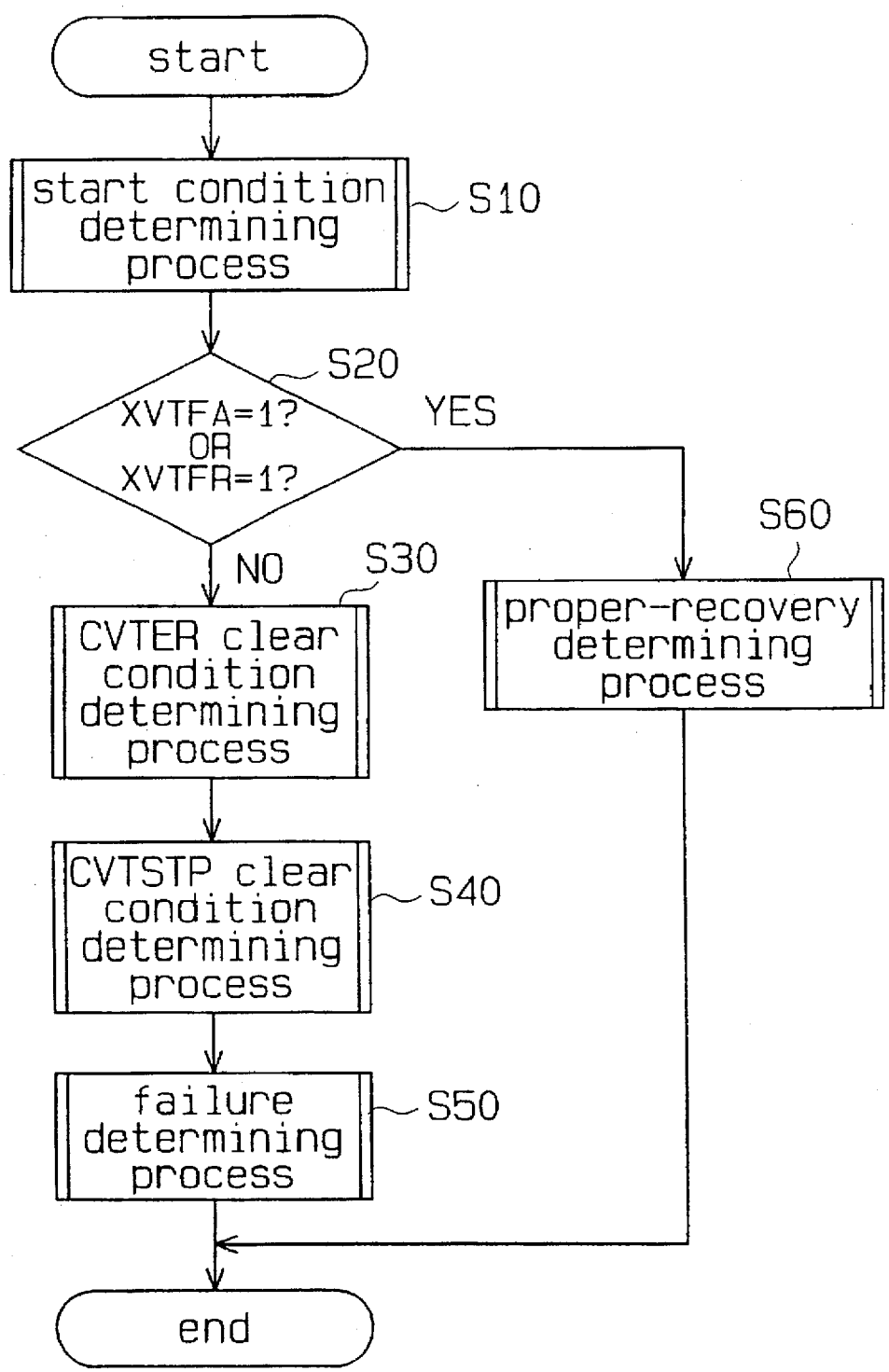
FIG. 4 is a flowchart illustrating the main routine of an abnormality/proper-recovery determining program according to the first and second embodiments.

A description will be now given of the individual determination programs in the form of subroutines in accordance with the main routine of the abnormality/proper-recovery determining program shown in FIG. 4. The character "S" in the flowcharts of the individual programs indicates a step.

When the main routine starts, the ECU 70 executes the subroutine of the start condition determining program (S10). This program determines whether the current running condition matches with the failure determination or the proper-recovery determination of the VVT 50. When it is not determined that the current running condition matches with the failure determination or the proper-recovery determination, this program disables the determination, extends the determination time and executes other necessary processing to prevent erroneous determination of a failure and the proper recovery.

Figure 5:
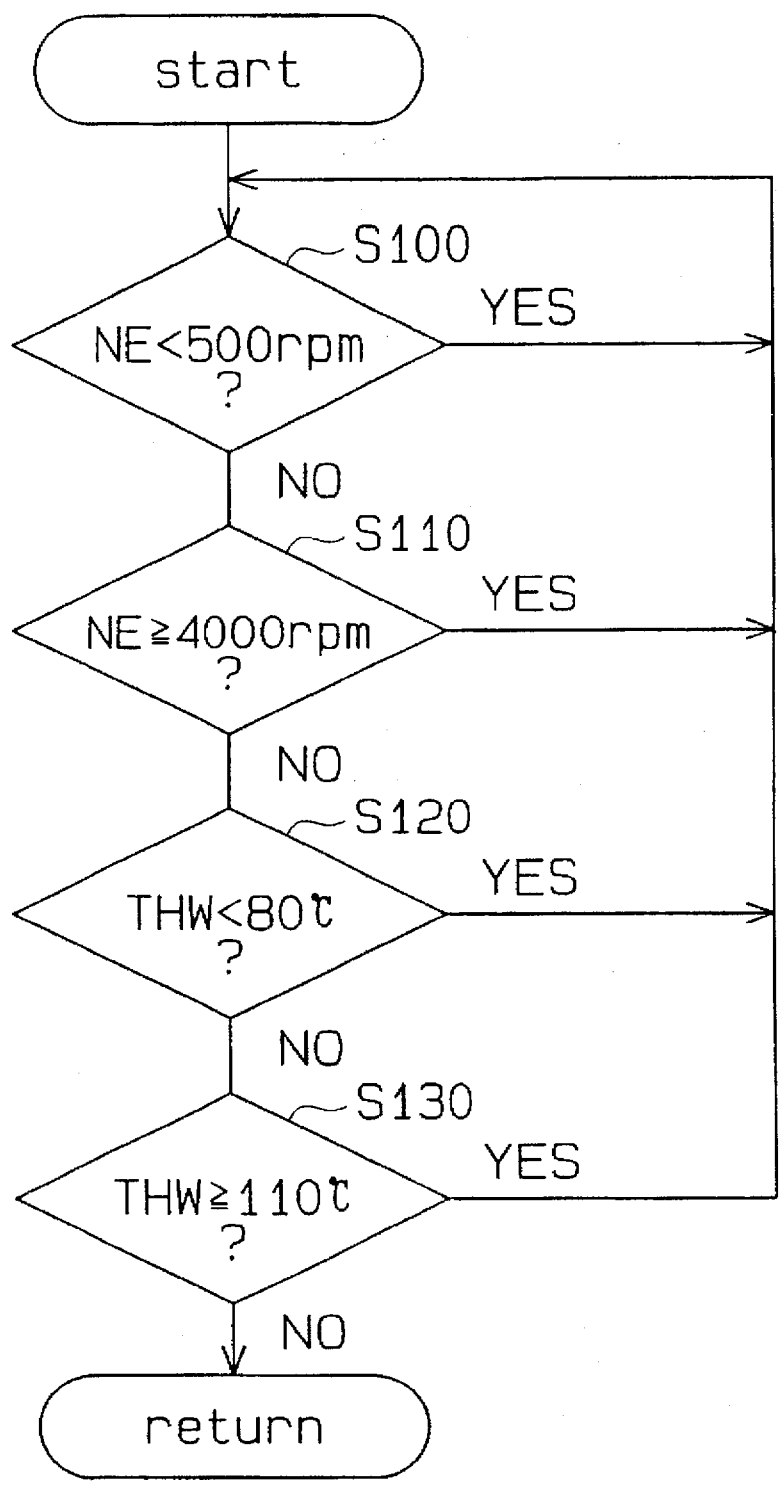
FIG. 5 is a flowchart illustrating a start condition determining program which is executed as a subroutine in the first embodiment.

This start condition determining program will be discussed with reference to the flowchart shown in FIG. 5. First, the ECU 70 determines if the engine speed NE detected by the engine speed sensor 41 is below 500 rpm (S100). When the engine speed NE is below 500 rpm (YES in S100), the ECU 70 inhibits proceeding to the next step until the engine speed NE reaches 500 rpm or rises above it.

When determining that the engine speed NE is equal to or greater than 500 rpm (NO in S100), the ECU 70 determines if the engine speed NE is equal to or above 4000 rpm (S110). When determining that the engine speed NE is equal to or greater than 4000 rpm (YES in S110), the ECU 70 returns to step S100. When determining that the engine speed NE is below 4000 rpm (NO in S110), on the other hand, the ECU 70 proceeds to step S120.

The following will explain the reason why the detection of a failure in the VVT 50 is executed only when the engine speed NE lies within a predetermined range (500 rpm<engine speed NE≦4000 rpm). First, when the engine speed NE is low, the cam angle signal detected by the cam angle sensor 44 varies so that even if the intake-side cam shaft 23 stops moving, it may be erroneously detected that the cam shaft 23 is still moving, and even if the cam shaft 23 is moving, it may be erroneously detected that the cam shaft 23 is stopped. When the engine speed NE is low, sufficient moment of inertia cannot be obtained and the rotation of the crankshaft 14 varies. This also causes a variation in the rotation of the intake-side cam shaft 23, which is driven by the crankshaft 14 via the timing belt 35.

When the engine speed NE is high, the precision of detecting the cam angle by the cam angle sensor 44 falls, which may result in erroneous detection. More specifically, the detection precision of the magnetic pickup which serves as the cam angle sensor 44 generally drops as the number of rotations of the magnetic rotor to be detected becomes large.

In the subsequent step S120, the ECU 70 determines if the coolant temperature THW detected by the coolant temperature sensor 43 is lower than 80° C. When determining that the coolant temperature THW is below 80° C. (YES in S120), the ECU 70 proceeds to step S100. When determining that the coolant temperature THW is equal to or higher than 80° C. (NO in S120), the ECU 70 proceeds to step S130 to determine if the coolant temperature THW is equal to or higher than 110° C. When determining that the coolant temperature THW is equal to or above 110° C. (YES in S130), the ECU 70 returns to step S100. When determining that the coolant temperature THW is below 110° C. (NO in S130), the ECU 70 proceeds to step S140.

The following is the reason why the detection of a failure in the VVT 50 is executed only when the coolant temperature THW lies within a predetermined range (80° C.≦coolant temperature THW<110° C.). As mentioned earlier, the VVT 50 of this embodiment is designed to be hydraulically driven by the lubricating oil. Generally speaking, the lubricating oil has high viscosity in a low-temperature environment and has low viscosity in a high-temperature environment. Before the engine 10 is sufficiently warmed up or when the coolant temperature THW is below 80° C., for example, the lubricating oil has a high viscosity and a low fluidity. Consequently, the fluid resistance or the like in the VVT 50 becomes higher than that in the case where the VVT 50 is driven by the lubricating oil after warm-up, making the action of the VVT 50 unstable. It therefore takes time for the real displacement angle VTB to converge to the target displacement angle VTT so that the VVT 50 may be erroneously detected as failing.

When the engine 10 is under a high temperature environment, for example, when the coolant temperature THW is equal to or above 110° C., the lubricating oil has a low viscosity and a high fluidity. Therefore, oil leakage easily occurs at, for example, the portion where the OCV 80 and the VVT 50 are connected so that a predetermined hydraulic pressure cannot be applied to the VVT 50, thus making the action of the VVT 50 unstable.

When all the conditions in the steps S100 to S130 are not met, the ECU 70 determines that the engine 10 is in such running conditions that a failure determination or proper-recovery determination can be performed, and enters the main routine from the subroutine. In the subsequent step S20, the ECU 70 determines if the VVT 50 is currently failing and the failure determination is in progress or if an advance-angle fail flag XVTFA=1 or a delay-angle fail flag XVTFR=1 is satisfied. When the advance-angle fail flag XVTFA and the delay-angle fail flag XVTFR are both "0" (NO in S20), the ECU 70 determines that the failure determination is not in progress and proceeds to step S30.

In S30, the ECU 70 executes a program for determining the conditions for clearing a sustain time counter CVTER which counts the time in which the absolute value of the difference between the target displacement angle VTT and the correct displacement angle VT is greater than a first predetermined value b. (Hereinafter, this program will be simply called "CVTER clear condition determining program".)

Figure 6:
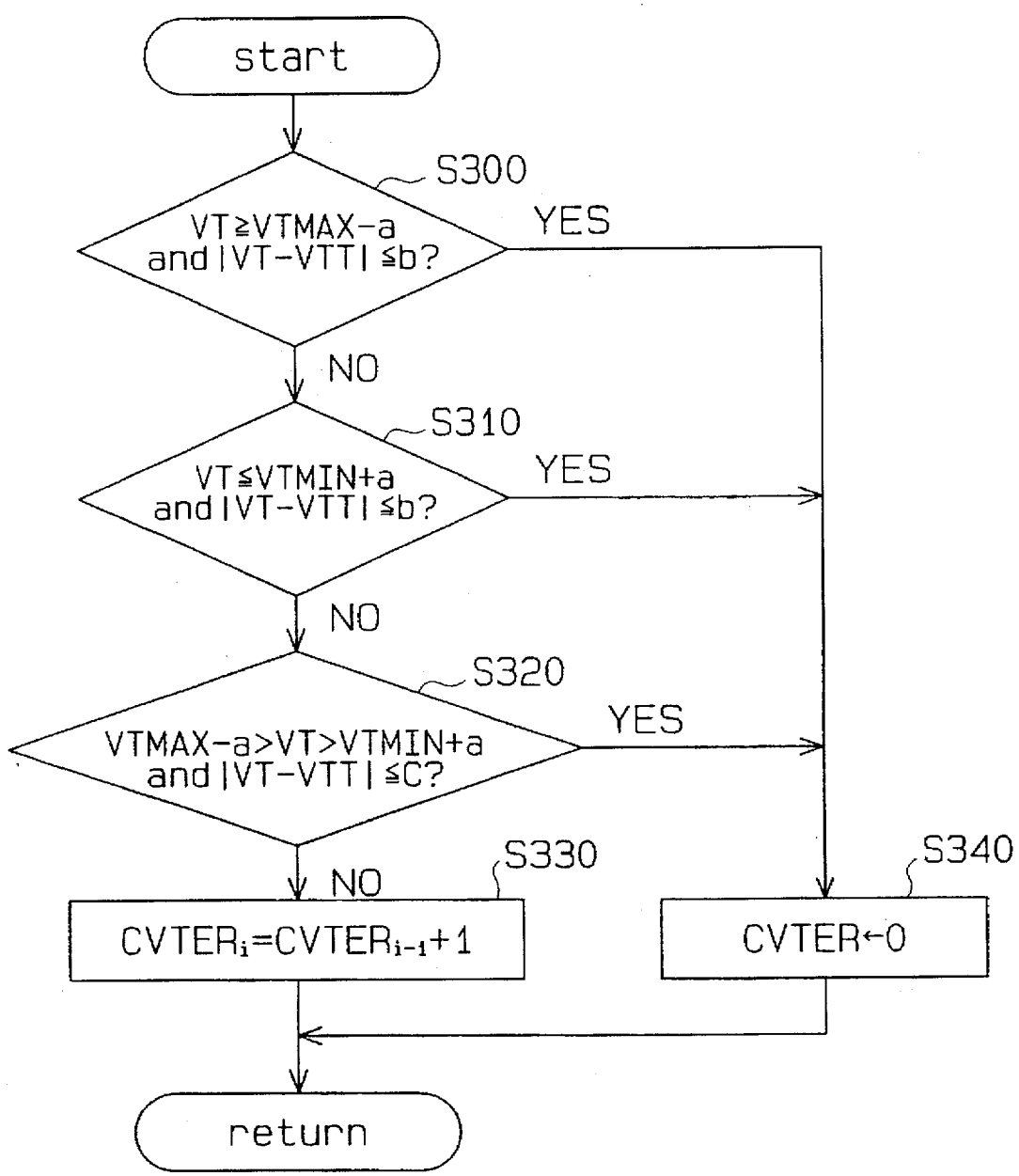
FIG. 6 is a flowchart illustrating a program for determining the condition for clearing a sustain time counter CVTER, which is executed as a subroutine in the first embodiment.
Figure 7:
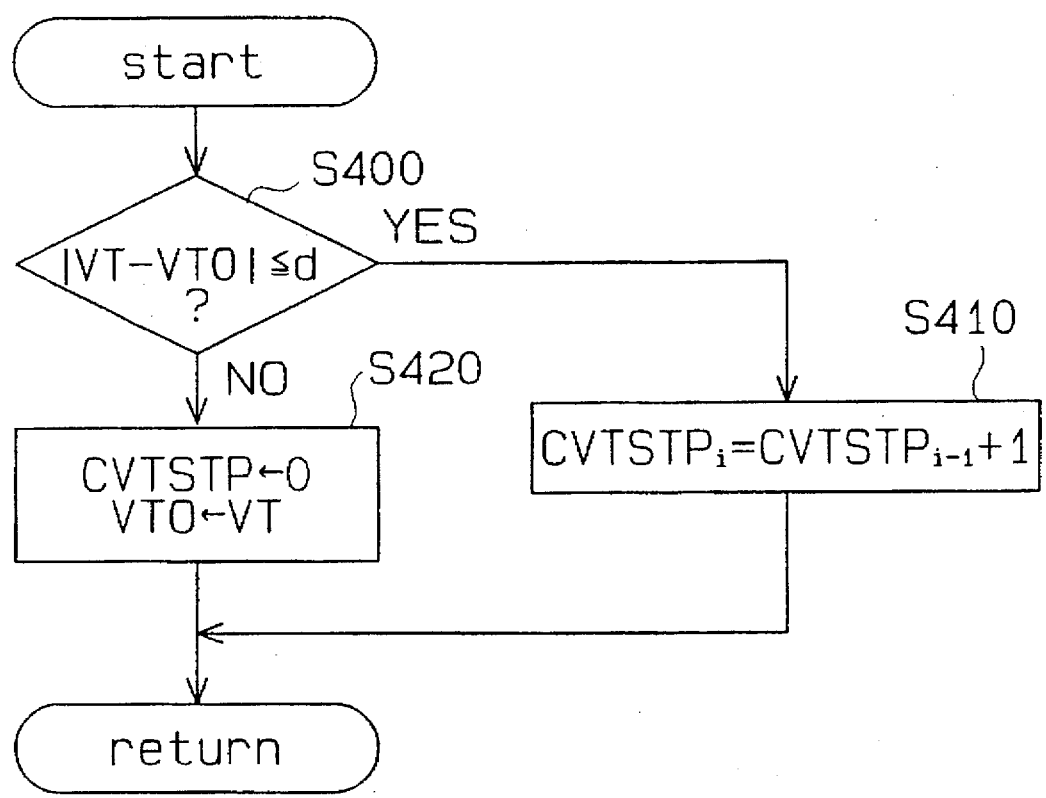
FIG. 7 is a flowchart illustrating a program for determining the condition for clearing a stop time counter CVTSTP, which is executed as a subroutine.
Figure 8:
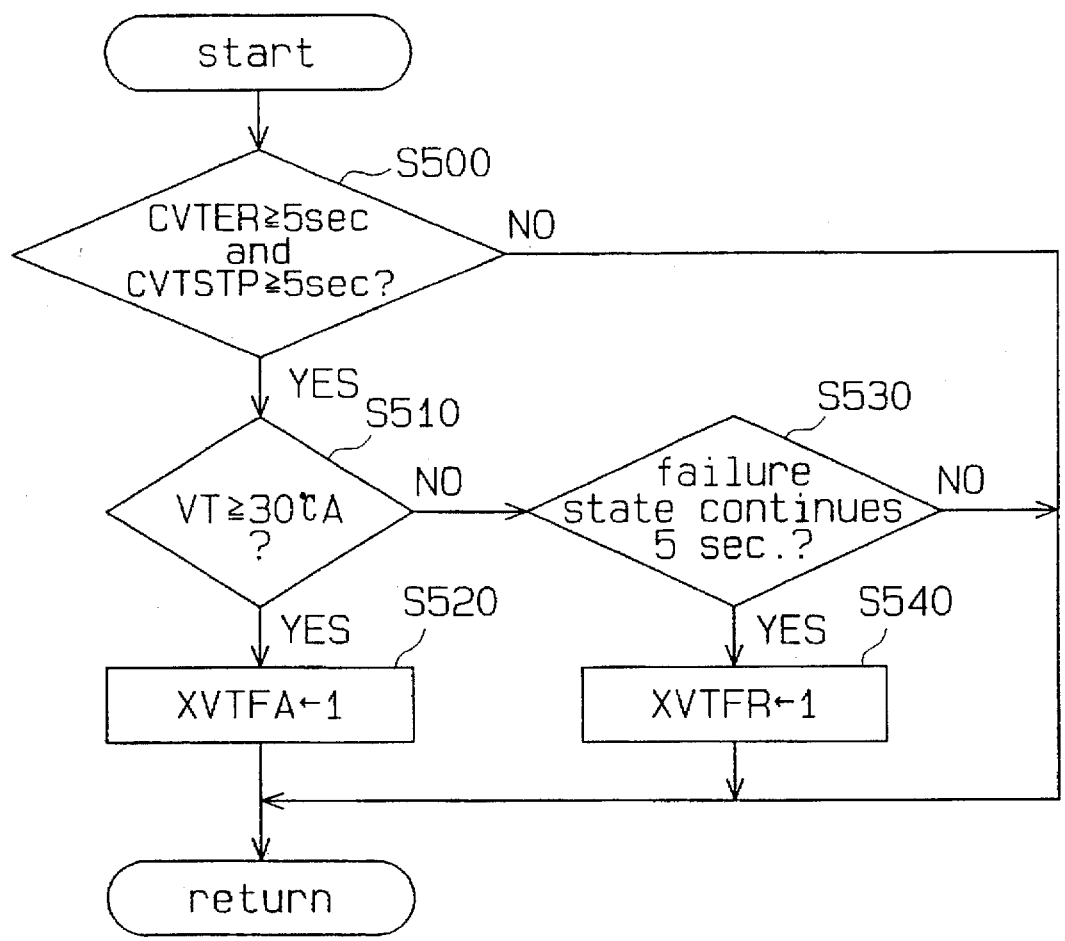
FIG. 8 is a flowchart illustrating a first failure determining program which is executed as a subroutine.

This CVTER clear condition determining program will now be discussed with reference to the flowchart shown in FIG. 6. The real displacement angle VTB is the actual displacement angle of the intake-side cam shaft 23 with respect to the crankshaft 14 and is computed as follows by the ECU 70 using the reference crank angle signal (reference timing signal) and the cam angle signal. First, the ECU 70 measures the signal interval (pulse interval) as a time from the point when the cam angle signal detected by the cam angle sensor 44 is input to the ECU 70 to the point when the reference timing signal detected by the crank angle sensor 40 is input to the ECU 70, by using the engine speed NE. Next, the ECU 70 uses the relationship between the known crank angle and time (engine speed NE) to convert the measured time to the real displacement angle VTB as a cam angle with respect to the crank angle.

The ECU 70 also determines the target displacement angle VTT based on the engine speed NE detected by the engine speed sensor 41 and the manifold pressure PM detected by the manifold pressure sensor 46. The ECU 70 acquires the correct displacement angle VT by subtracting a maximum delay-angle learning value GVTFR from the real displacement angle VTB. Further, the ECU 70 acquires the maximum delay-angle learning value GVTFR by learning the maximum delay-angle displacement of the intake-side cam shaft 23 with respect to the crankshaft 14 as the reference displacement angle of the VVT 50.

First, in S300, the ECU 70 determines if the correct real displacement angle VT is in the vicinity of the maximum advance angle by using the near-maximum-advance-angle displacement angle obtained by subtracting a neighborhood value a from the maximum advance-angle displacement angle VTMAX. The ECU 70 also determines if the absolute value of the difference between the correct real displacement angle VT and the target displacement angle VTT is equal to or smaller than a first predetermined value b set larger than a normal first predetermined value c to be described later. When it is determined that the correct real displacement angle VT is equal to or greater than the near-maximum-advance-angle displacement angle (VTMAX−a) and that the absolute value of the difference between the correct real displacement angle VT and the target displacement angle VTT is equal to or smaller than the first predetermined value b (YES in S300), the ECU 70 proceeds to step S340 to reset the sustain time counter CVTER to "0".

When it is determined that the correct real displacement angle VT is smaller than the near-maximum-advance-angle displacement angle (VTMAX−a) or that the absolute value of the difference between the correct real displacement angle VT and the target displacement angle VTT is greater than the first predetermined value b (NO in S300), the ECU 70 proceeds to the next step.

The first predetermined value b used is larger than the normal first predetermined value c. Because of the size tolerance of components of the VVT 50, the maximum displacement angles accomplished by different VVTs 50 vary from one VVT to another, and the achieved maximum displacement angle may not match with the target displacement angle VTT at the maximum advance angle. When the maximum advance-angle displacement angle VTMAX achieved by the VVT 50 is smaller than the target displacement angle VTT at the maximum advance angle, therefore, the absolute value of the difference between the target displacement angle VTT and the correct real displacement angle VT is not reduced even if the VVT 50 has achieved the displacement angle at the maximum advance angle from the mechanical point of view. In this case, it may be erroneously detected that the VTT 50 is failing. When the correct real displacement angle VT is in the vicinity of the maximum displacement angle, therefore, it is necessary to relax the standard for the determination of whether or not the correct real displacement angle VT is converged to the target displacement angle VTT, as compared with the case where the correct real displacement angle VT takes another displacement angle.

When the maximum delay-angle displacement angle "VTMIN" achieved by the VVT 50 is greater than the target displacement angle VTT at the maximum displacement angle, the absolute value of the difference between the target displacement angle VTT and the correct real displacement angle VT is not reduced even if the VVT 50 has achieved the displacement angle at the maximum delay angle from the mechanical point of view. In this case, it may be erroneously detected that the VTT 50 is failing.

In the subsequent step S310, the ECU 70 determines if the correct real displacement angle VT is in the vicinity of the maximum advance angle by using the near-maximum-delay-angle displacement angle obtained by adding the neighborhood value a to the maximum delay-angle displacement angle VTMIN, and also determines if the absolute value of the difference between the correct real displacement angle VT and the target displacement angle VTT is equal to or smaller than the relaxed first predetermined value b. When determining that the correct real displacement angle VT is equal to or smaller than the near-maximum-delay-angle displacement angle (VTMIN+a) and that the absolute value of the difference between the correct real displacement angle VT and the target displacement angle VTT is equal to or smaller than the first predetermined value b (YES in S310), the ECU 70 proceeds to step S340 to reset the sustain time counter CVTER to "0".

When determining that the correct real displacement angle VT is greater than the near-maximum-delay-angle displacement angle (VTMIN+a) or that the absolute value of the difference between the correct real displacement angle VT and the target displacement angle VTT is greater than the first predetermined value b (NO in S310), the ECU 70 proceeds to the next step S320.

In step S320, the ECU 70 determines that the absolute value of the difference between the correct real displacement angle VT and the target displacement angle VTT is equal to or smaller than the normal first predetermined value c when the correct real displacement angle VT is other than the near-maximum-advance-angle displacement angle or the near-maximum-delay-angle displacement angle.

More specifically, when determining that the correct real displacement angle VT is greater than the near-maximum-delay-angle displacement angle (VTMIN+a) and smaller than the near-maximum-advance-angle displacement angle (VTMAX−a) and that the absolute value of the difference between the correct real displacement angle VT and the target displacement angle VTT is equal to or smaller than the normal first predetermined value c (YES in S320), the ECU 70 proceeds to step S340 to reset the sustain time counter CVTER to "0".

When determining that the correct real displacement angle VT is smaller than the near-maximum-delay-angle displacement angle (VTMIN+a) or is equal to or greater than the near-maximum-advance-angle displacement angle (VTMAX−a) or that the absolute value of the difference between the correct real displacement angle VT and the target displacement angle VTT is greater than the normal first predetermined value c is met (NO in S320), the ECU 70 proceeds to the next step S330.

In S330, or when none of the determination conditions in S300 to S320 are met, the ECU 70 increments the sustain time counter CVTER (as one of the conditions for starting the failure detection in the main routine) by "1". When the processes in S330 and S340 are finished, the ECU 70 goes to the main routine from the subroutine.

In the main routine, the ECU 70 proceeds to step S40 to execute a subroutine or a program for determining the conditions to clear a stop time counter CVTSTP, which counts the time in which the real displacement angle VTB is stopped. (Hereinafter, this program will be simply called "CVTSTP clear condition determining program".) This CVTSTP clear condition determining program will be discussed below with reference to the flowchart shown in FIG. 7.

First, in S400, the ECU 70 determines if the absolute value of a change in the displacement angle of the intake-side cam shaft 23 with respect to the crankshaft 14 or the absolute value of the difference between the correct real displacement angle VT currently detected and the correct real displacement angle VTO previously detected is equal to or smaller than a second predetermined value d.

When determining that the absolute value of the difference between the correct real displacement angle VT currently detected and the correct real displacement angle VTO previously detected is equal to or smaller than a second predetermined value d (YES in S400), the ECU 70 determines that the displacement angle of the intake-side cam shaft 23 has not changed and proceeds to step S410. In S410, the ECU 70 increments the stop time counter CVTSTP (as one of the conditions for starting the failure detection in the main routine) by "1".

When determining that the absolute value of the difference between the correct real displacement angle VT currently detected and the correct real displacement angle VTO previously detected is greater than the second predetermined value d (NO in S400), the ECU 70 determines that the displacement angle of the intake-side cam shaft 23 is changing and proceeds to step S420. In S420, the ECU 70 resets the stop time counter CVTSTP to "0" and stores the currently detected correct real displacement angle VT as the correct real displacement angle VTO. When the processes in S410 and S420 are finished, the ECU 70 proceeds to the main routine from the subroutine.

The ECU 70 goes to step S50 in the main routine to execute the failure determining program as a subroutine. This failure determining program will be now discussed referring to the flowchart shown in FIG. 8.

In the failure determining program, the ECU 70 determines that the VVT 50 is failing based on the results of the determination processes executed in S30 and S40. When there is a failure, the ECU 70 determines if the failure is an advance-angle failure or a delay-angle failure.

First, in S500, the ECU 70 determines if the sustain time counter CVTER is equal to 5 sec. or longer and the stop time counter CVTSTP is equal to 5 sec. or longer. That is, the ECU 70 determines if the absolute value of the difference between the target displacement angle VTT and the correct real displacement angle VT has been determined as greater than the first predetermined value b five or more times and if a change in the correct real displacement angle VT has been determined as equal to or smaller than the second predetermined value d five or more times. When determining that the sustain time counter CVTER is equal to 5 sec. or longer and the stop time counter CVTSTP is equal to 5 sec. or longer (YES in S500), the ECU 70 proceeds to step S510.

When determining that either one of the sustain time counter CVTER or the stop time counter CVTSTP being equal to 5 sec. or longer is not satisfied (NO in S500), the ECU 70 determines that no failure is present in the VVT 50. Then, the ECU 70 sets neither an advance-angle fail flag XVTFA nor a delay-angle fail flag XVTFR. Next, the ECU 70 returns to the main routine from the subroutine.

In S510, the ECU 70 determines if the current correct real displacement angle VT is equal to or greater than 30 degrees CA, and sets the advance-angle fail flag XVTFA (S520) when the decision in S510 is YES. That is, the ECU 70 determines that the VTT 50 in the advance angle state is failing based on the fact that the correct real displacement angle VT is equal to or greater than 30 degrees CA.

When determining in S510 that the current correct real displacement angle VT is smaller than 30 degrees CA (NO in S510), the ECU 70 determines if 5 sec. have passed after the execution of the feedback control that converges the correct real displacement angle VT to the target displacement angle VTT (S530). When determining that 5 sec. have passed after the execution of this feedback control (YES in S530), the ECU 70 sets the relay-angle fail flag XVTFR (S540). That is, the ECU 70 determines that the VVT 50 in the delay angle state is failing based on the fact that the correct real displacement angle VT is smaller than 30 degrees CA and the displacement of the correct real displacement angle VT is not detected even when 5 sec. have passed since the execution of the feedback control.

When determining that 5 sec. have not passed since the execution of the feedback control (NO in S530), the ECU 70 determines that there is no failure in the VVT 50 and sets neither the advance-angle fail flag XVTFA nor the delay-angle fail flag XVTFR. Then, the ECU returns to the main routine from this subroutine.

Figure 9:
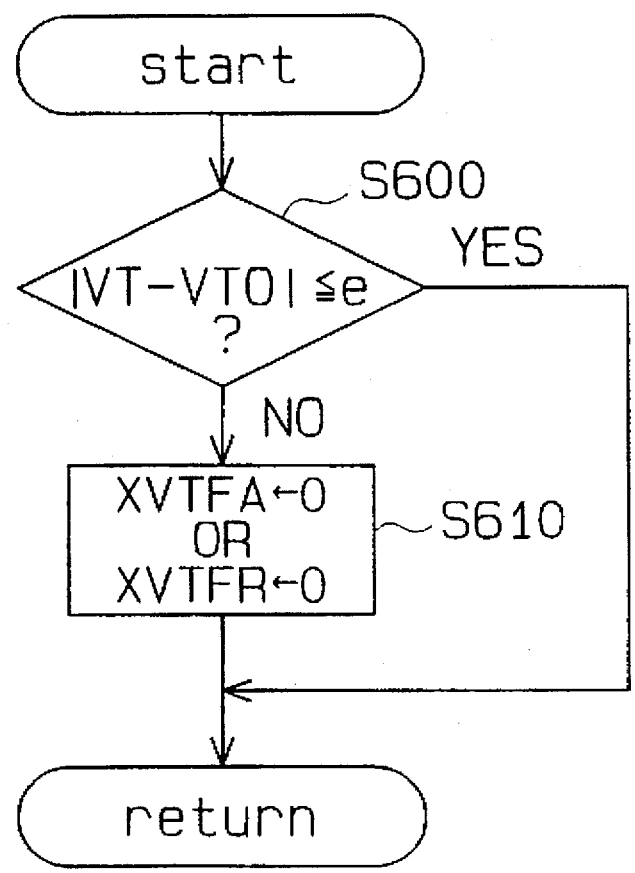
FIG. 9 is a flowchart illustrating a proper recovery determining program which is executed as a subroutine.

The proper-recovery determining program will be now discussed with reference to the flowchart shown in FIG. 9. This proper-recovery determining program is a subroutine program that determines if a failure in the VVT 50, which has been determined as having had a failure, has been cleared and the VVT 50 has returned to the proper state. When determining that either the advance-angle fail flag XVTFA=1 or the delay-angle fail flag XVTFR=1 is determined in S20 in the main routine (YES in S20), the ECU 70 executes this program.

In the proper-recovery determination, the ECU 70 determines if the absolute value of the difference between the currently detected correct real displacement angle VT and the previously detected correct real displacement angle VTO is equal to or smaller than a third predetermined value e (S600). To prevent chattering from occurring by the frequently performed proper-recovery determination and failure determination, a hysteresis is provided between the third predetermined value e and the second predetermined value d, the former value e being set greater than the latter value d.

When the absolute value of the difference between the currently detected correct real displacement angle VT and the previously detected correct real displacement angle VTO is equal to or below the third predetermined value e (YES in S600), the ECU 70 determines that the displacement angle of the intake-side cam shaft 23 has not changed by a sufficient amount for the determination of the proper recovery of the VVT 50 and does not determine the proper recovery.

When the absolute value of the difference between the currently detected correct real displacement angle VT and the previously detected correct real displacement angle VTO is greater than the third predetermined value e (NO in S600), the ECU 70 determines that the displacement angle of the intake-side cam shaft 23 has changed by a sufficient amount for the determination of the proper recovery of the VVT 50 and thus determines the proper recovery. In the subsequent step S610, the ECU 70 sets off either the advance-angle fail flag XVTFA or the delay-angle fail flag XVTFR which has been determined as having been set in S20. As a result, the failure associated processes in various controls based on the advance-angle fail flag XVTFA or the delay-angle fail flag XVTFR are canceled and the normal various controls are to be executed.

An abnormality detecting apparatus VC for a valve timing control apparatus according to the second embodiment will be now described with reference to the accompanying drawings. As the structure of this abnormality detecting apparatus VC for a valve timing control apparatus according to the second embodiment is the same as that of the abnormality detecting apparatus VC of the first embodiment, the same reference numerals or symbols are used and their descriptions will be omitted.

The abnormality detecting apparatus VC for a valve timing control apparatus according to the second embodiment is characterized in that the time for the proper-recovery determination is made longer to suppress the occurrence of erroneous determination instead of inhibiting the execution of the failure determining process or the proper-recovery determining process when the VVT 50 functions unstably. This point will be mainly described below with reference to FIGS. 10 and 11.

Figure 10:
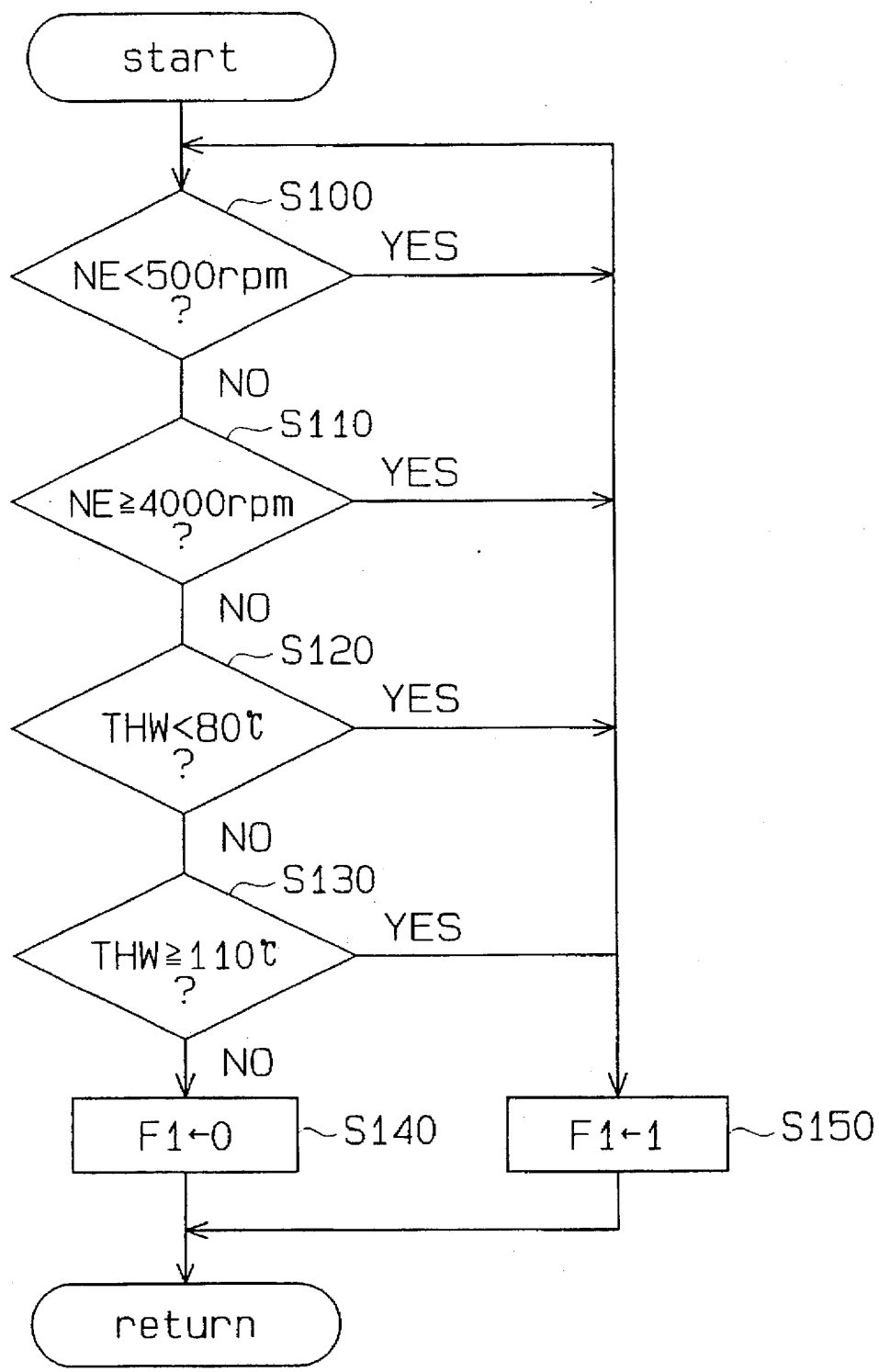
FIG. 10 is a flowchart illustrating a start condition determining program which is executed as a subroutine in the second embodiment.

In FIG. 10, the determinations by the ECU 70 in the individual steps S100 to S130 are executed in the same way as has been explained in the foregoing description of the first embodiment. When the decision is "YES" in each step, however, the ECU 70 proceeds to step S150 without returning to step S100 and sets an unstable function flag F1 indicating that the function of the VVT 50 is unstable. When the decision in S130 is "NO", the ECU 70 proceeds to step S140 to set off the unstable function flag F1. When the unstable function flag F1 is set, therefore, the ECU 70 determines that the function of the VVT 50 is unstable and executes various controls according to this condition.

Figure 11:
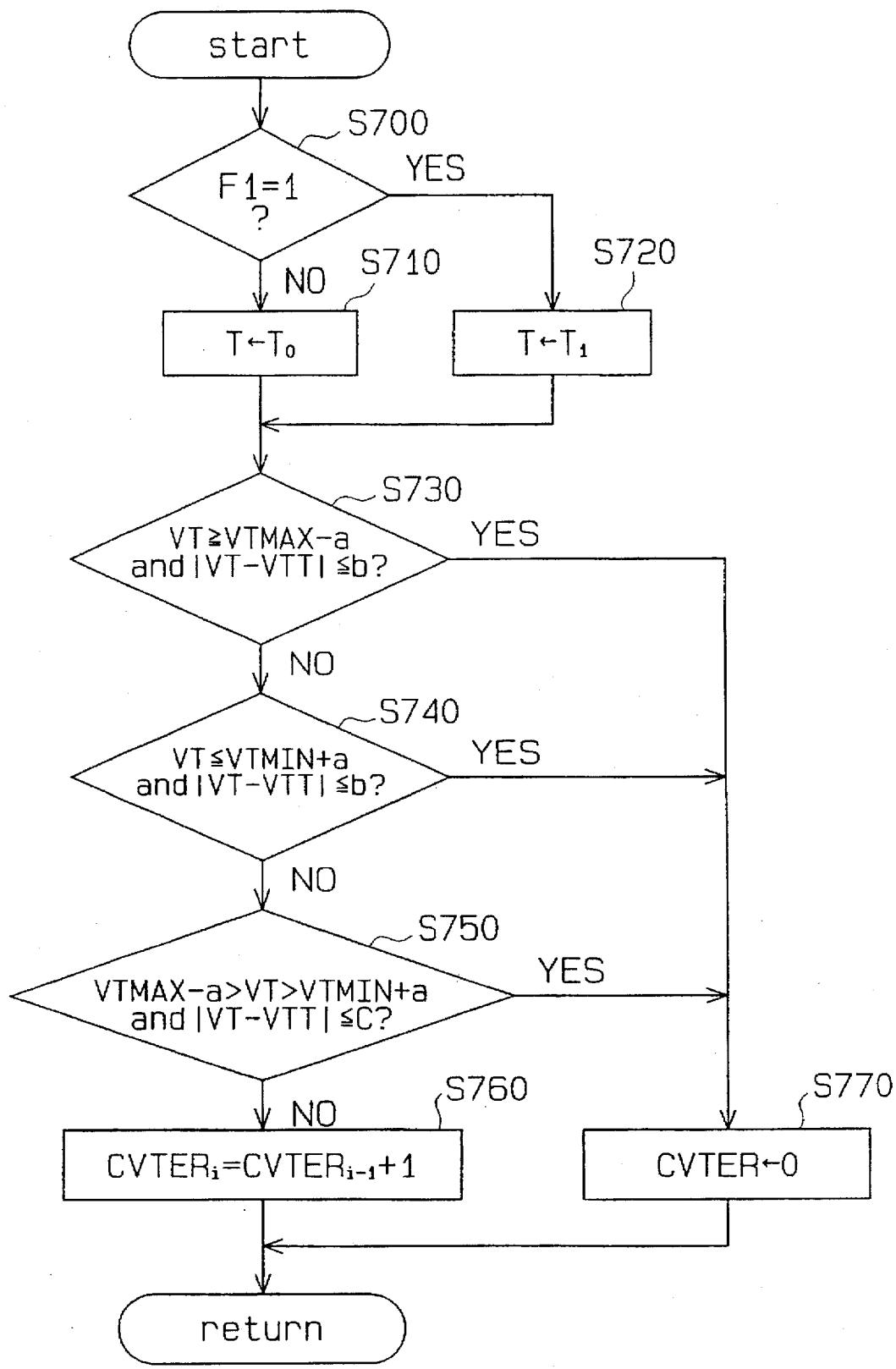
FIG. 11 is a flowchart illustrating a program for determining the condition for clearing a sustain time counter CVTER, which is executed as a subroutine in the second embodiment.

One example of such controls will be described with reference to the flowchart shown in FIG. 11. As the individual steps S730 to S770 in this flowchart correspond to steps S300 to S340 in the flowchart shown in FIG. 6 as used in the first embodiment, their descriptions will be now omitted.

In S700, the ECU 70 determines if the unstable function flag F1 is set (F1=1), and if it is determined that the unstable function flag F1 is not set (NO in S700), the ECU 70 stores $T_0$ as the determination time T for determining if the absolute value of the aforementioned difference is equal to or smaller than a predetermined valve. This determination time T is needed to determine if the absolute value of the difference between the correct real displacement angle VT and the target displacement angle VTT is equal to or smaller than the first predetermined value b. The ECU 70 determines the absolute value of the difference detected within this time as the absolute value of the difference between the currently correct real displacement angle VT and the target displacement angle VTT.

When determining that the unstable function flag F1 is set (YES in S700), the ECU 70 stores T1 as the determination time To The time T1 thus stored is longer than $T_0$. By making the determination time longer, it is possible to suppress erroneous determination caused, for example, when the fluidity of the lubricating oil is low and the function of the VVT 50 is unstable.

As described in detail above, the abnormality detecting apparatuses VC for a valve timing control apparatus according to the first and second embodiments are so designed as to determine that the VVT 50 is failing when the absolute value of the difference between the target displacement angle VTT and the correct displacement angle VT is greater than the first predetermined values b and c and the absolute value of the difference between the correct real displacement angle VT and the previous correct real displacement angle VTO is equal to or smaller than the second predetermined value d. It is therefore possible to avoid erroneous determination that the VVT 50 is failing although the correct real displacement angle VT is changing in the initial stage where the absolute value of the difference between the target displacement angle VTT and the correct real displacement angle VT is large.

When the target displacement angle VTT is in the vicinity of the maximum displacement angle, the first predetermined value b, set greater than the normal first predetermined value c that is used when the target displacement angle VTT is not located in the vicinity of the maximum displacement angle, is used as the threshold value used for the determination of the absolute value of the difference between the target displacement angle VTT and the correct real displacement angle VT.

Therefore, even if the functionable range of the VVT 50 varies due to the size tolerances of the components and the correct real displacement angle VT does not match with the target displacement angle VTT at the maximum displacement, it is possible to determine that the correct real displacement angle VT has reached the target displacement angle VTT at the maximum displacement.

Consequently, the occurrence of a failure is not erroneously determined merely by the fact that the correct real displacement angle VT does not coincide with the target displacement angle VTT at the maximum displacement, even though the real displacement angle VTB of the intake-side cam shaft 23 with respect to the crankshaft 14 is changed most from the mechanical viewpoint.

Further, those abnormality detecting apparatuses VC for a valve timing control apparatus are so designed to execute the proper-recovery determining program which determines if the VVT 50 is properly recovered from a failed state by checking whether or not the absolute value of the difference between the correct real displacement angle VT and the previous correct real displacement angle VTO is greater than the third predetermined value e. It is therefore possible to avoid erroneous determination that the proper recovery is achieved even though the VTT 50 is in a constant failing state, unlike in the case where the proper recovery is determined by checking the target displacement angle VTT, which changes from time to time in accordance with the running conditions of the engine, and the correct real displacement angle VT.

Further, the third predetermined value e (threshold value) for determining the absolute value of the difference between the correct real displacement angle VT and the previous correct real displacement angle VTO in use is greater than the second predetermined value used for the failure determination. Thus, execution of the proper-recovery determination and failure determination is suppressed and chattering caused by such frequent execution is prevented. It is therefore possible to avoid a frequent change in the control amount that is affected by the result of the proper-recovery determination or the failure determination.

The abnormality detecting apparatuses are designed so that when the VVT 50 is in an unstable functional state, the failure determining program and the proper-recovery determining program are not executed. With the VVT 50 being functionally unstable, for example, when the operational resistance is high because of a low oil viscosity and a longer time is needed for the correct real displacement angle VT to converge to the target displacement angle VTT as compared with the case of the normal oil viscosity, therefore, the failure determining program and the proper-recovery determining program are not executed. It is therefore possible to avoid erroneous determination that the VVT 50 is failing even though the correct real displacement angle VT is changing toward the target displacement angle VTT.

The abnormality detecting apparatuses are further designed so that when the VVT 50 is in an unstable functional state, the determination time T in the failure determining program or the proper-recovery determining program is made longer. With the VVT 50 being functionally unstable, for example, when the operational resistance is high because of a low oil viscosity and a longer time is needed for the correct real displacement angle VT to converge to the target displacement angle VTT as compared with the case of the normal oil viscosity, therefore, the determination time T is made longer. It is therefore possible to avoid erroneous determination that the VVT 50 is failing even though the correct real displacement angle VT is changing toward the target displacement angle VTT.

An abnormality detecting apparatus VC for a valve timing control apparatus according to the third embodiment will be now described with reference to the accompanying drawings. As the structure of this abnormality detecting apparatus VC according to the third embodiment is the same as those of the abnormality detecting apparatuses VC of the first and second embodiments, the same reference numerals or symbols are used and their descriptions will be omitted.

The ECU 70 has the ROM 71 storing an abnormality determining program for determining an abnormality in the engine 10, which is executed as the main routine, and a map for changing the displacement angle of the intake-side cam shaft 23 according to various conditions. The ROM 71 also holds various control programs such as a second failure determining program, a CVTER clear condition determining program and a CVTSTP clear condition determining program, which are executed as subroutines. The abnormality determining program in the abnormality detecting apparatus VC for an internal combustion engine having a variable valve timing mechanism according to this embodiment will be now described with reference to the flowcharts shown in FIGS. 12 and 13.

The abnormality determining program has, as a main subroutine, a failure determining program for determining if a failure (abnormality) has occurred in the section between the timing belt 35 and the intake-side timing pulley 27. The ECU 70 executes the abnormality determining program every 240 degrees CA, for example, while the engine 10 is running.

Figure 12:
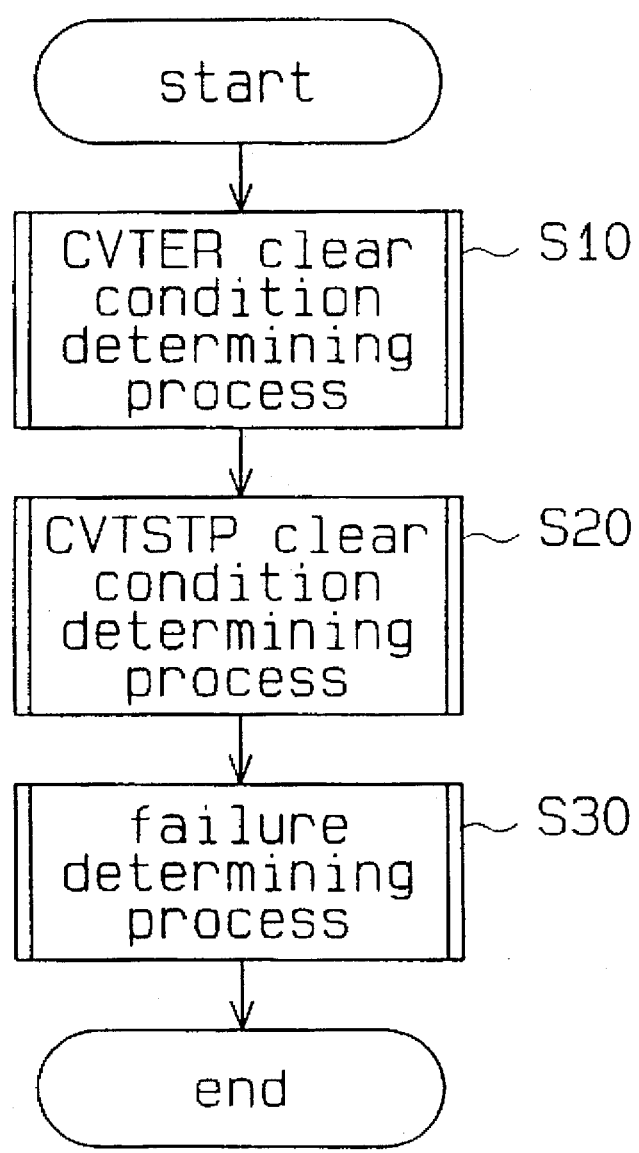
FIG. 12 is a flowchart illustrating the main routine of an abnormality determining program according to the third embodiment.
Figure 13:
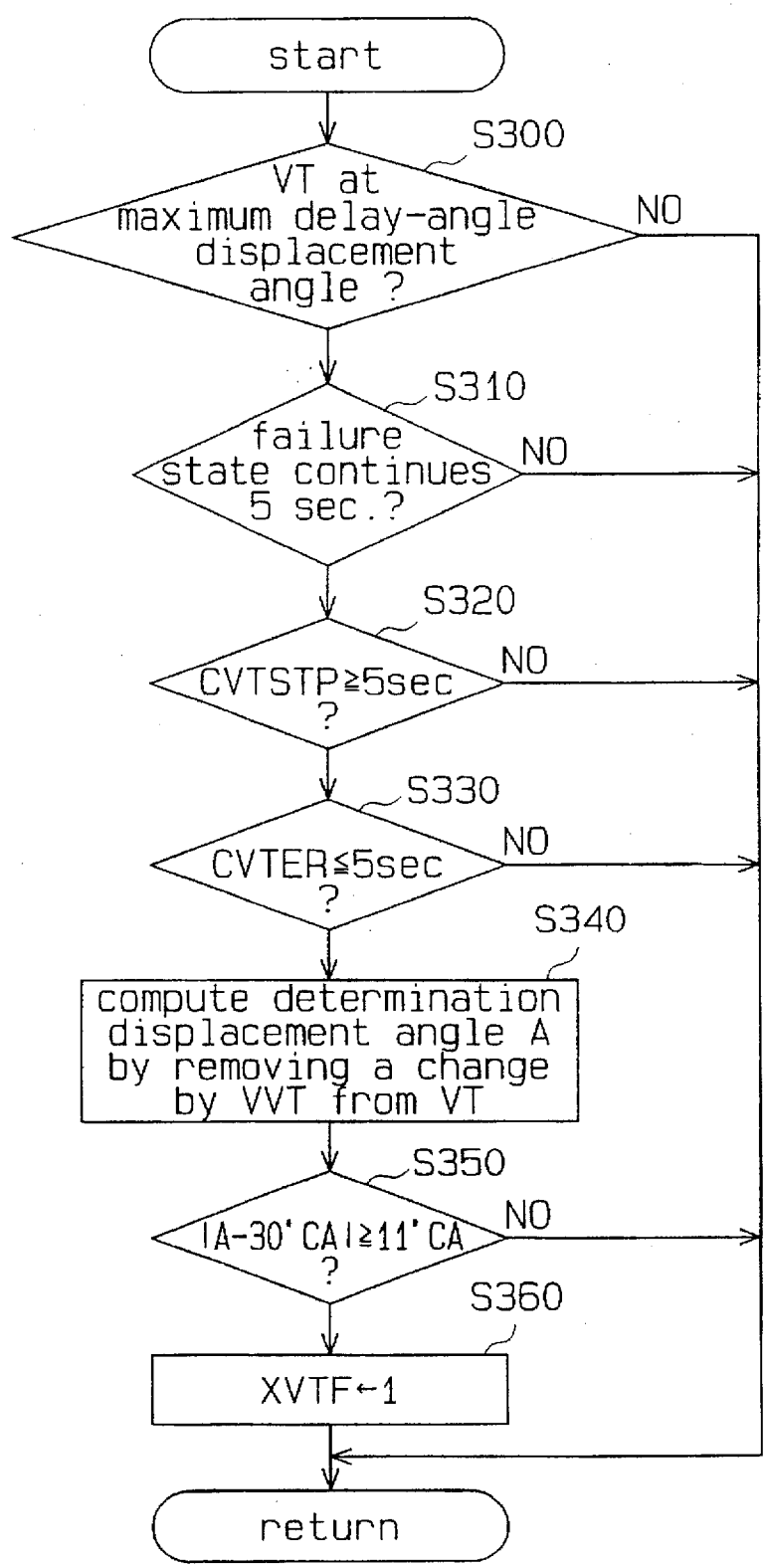
FIG. 13 is a flowchart illustrating a second failure determining program which is executed as a subroutine in the third embodiment.

A description will be now given of the individual determination programs in the subroutine in accordance with the main routine of the abnormality determining program shown in FIG. 12. The character "S" in the flowcharts of the individual programs indicates a step. When the main routine starts, the ECU 70 executes the subroutine of the CVTER clear condition determining program (S1000). Because this program is the same as the CVTER clear condition determining program (see S30 in FIG. 4 and FIG. 5) in the first embodiment, its description will not be given here. When the CVTER clear condition determining program is finished, the ECU 70 returns to the main routine from the subroutine.

In the main routine, the ECU 70 proceeds to step S2000 to execute the CVTSTP clear condition determining program for counting the time in which the real displacement angle VTB is stopped. Because this program is the same as the CVTSTP clear condition determining program (see S40 in FIG. 4 and FIG. 6) in the first embodiment, its description will be omitted here. When the CVTSTP clear condition determining program is finished, the ECU 70 returns to the main routine from the subroutine.

In the main routine, the ECU 70 proceeds to step S3000 to execute the second failure determining program as a subroutine. This second failure determining program will be now discussed with reference to the flowchart shown in FIG. 13. In this failure determining program, the ECU 70 determines if there is a failure in the section between the timing belt 35 and the intake-side timing pulley 27 based on the results of the determination processes executed in S1000 and S2000. That is, the ECU 70 determines if the predetermined displacement angle of the intake-side cam shaft 23 with respect to the crankshaft 14 is shifted due to the improper setting of the timing belt, the improper teeth engagement of the timing belt or the like.

First, in S3100, the ECU 70 determines if the intake-side cam shaft 23 is shifted to the displacement angle at the maximum delay angle. That is, the failure determining program is designed to execute failure determination when the intake-side cam shaft 23 is held at the predetermined target displacement angle VTT in order to execute an accurate failure determination. In this embodiment, the displacement angle at the maximum delay angle, at which the ring gear 59 abuts on the housing 56 and the action of the ring gear 59 (intake-side cam shaft 23) is physically restricted, is used as the predetermined target displacement angle VTT.

When determining that the intake-side cam shaft 23 is shifted to the displacement angle at the maximum delay angle (YES in S3100), the ECU 70 proceeds to step S3200. When determining that the intake-side cam shaft 23 has not yet been shifted to the displacement angle at the maximum delay angle (NO in S3100), on the other hand, the ECU 70 returns to the main routine from the subroutine.

In the next step S3200, the ECU 70 determines if 5 sec. have passed since the execution of the feedback control that converges the correct real displacement angle VT to the target displacement angle VTT at the maximum delay angle. In other words, 5 sec. are waited after the intake-side cam shaft 23 is shifted to the displacement angle at the maximum delay angle so that the behavior of the intake-side cam shaft 23 is stabilized, thus improving the accuracy in the failure determination.

When determining that 5 sec. have passed since the execution of the feedback control that converges the correct real displacement angle VT to the target displacement angle VTT (YES in S3200), the ECU 70 proceeds to step S3300. When determining that 5 sec. have not yet passed since the execution of the feedback control (NO in S3200), the ECU 70 returns to the main routine from the subroutine.

In the subsequent step S3300, the ECU 70 determines if the stop time counter CVTSTP is equal to or greater than 5 sec. That is, the ECU 70 determines if the determination of a change in the correct real displacement angle VT being equal to or smaller than the third predetermined value d has been made five or more times. When the ECU 70 determines that the stop time counter CVTSTP is equal to or longer than 5 sec. (YES in S3300), in which case the intake-side cam shaft 23 is held at the displacement angle at the maximum delay angle and is very stable, the ECU 70 proceeds to a step of the determination of a failure in the valve timing. When the ECU 70 determines that the stop time counter CVTSTP is smaller than 5 sec. (NO in S3300), in which case the intake-side cam shaft 23 is not held at the displacement angle at the maximum delay angle and the state is not suitable for the determination of a valve timing failure, the ECU 70 returns to the main routine from the subroutine.

In the next step S3400, the ECU 70 determines if the sustain time counter CVTER is 5 sec. or smaller. That is, the ECU 70 determines if the determination of the difference between the target displacement angle VTT and the correct real displacement angle VT being greater than the second predetermined values b and c has been made five time or less.

When determining that the sustain time counter CVTER is equal to or smaller than 5 sec. (YES in S3400), which means that the intake-side cam shaft 23 is converged to the target displacement angle VTT (maximum delay-angle displacement angle), the ECU 70 proceeds to a step of the determination of a valve timing failure.

When determining that the sustain time counter CVTER is longer than 5 sec. (NO in S3400), in which case the intake-side cam shaft 23 has not yet been converged to the target displacement angle VTT and the VVT 50 is failing due to the engagement with a foreign matter inside the VVT 50. Consequently, the ECU 70 returns to the main routine without executing the subsequent steps in this subroutine.

In S3500, the ECU 70 computes the amount of a change in the displacement angle of the intake-side cam shaft 23 from the correct real displacement angle VT of the intake-side cam shaft 23 shifted to the target displacement angle VTT and the maximum delay-angle displacement angle as the reference displacement angle of the intake-side cam shaft 23. Further, the ECU 70 removes the acquired shift amount of the displacement angle from the correct real displacement angle VT to compute a displacement angle A for the determination. In this embodiment, 30 degrees CA is used as the displacement angle of the intake-side cam shaft 23 with respect to the crankshaft 14 from the structural viewpoint of the VVT 50 or the maximum delay-angle displacement angle (reference displacement angle).

In the next step S3600, the ECU 70 determines if the difference between the determination displacement angle A and the structural displacement angle of 30 degrees CA (reference displacement angle) of the VVT 50 is equal to or greater than the first predetermined value e.

The determination displacement angle A computed in the previous step S3500 should steadily indicate a displacement angle close to the structural displacement angle of 30 degrees CA even in view of size tolerances of the parts or the like unless there is a failure such as the misengagement between the timing belt 35 and the intake-side timing pulley 27. By checking if the difference between the determination displacement angle A and the structural displacement angle of 30 degrees CA is equal to or greater than the first predetermined value e, therefore, a failure occurring between the timing belt 35 and the intake-side timing pulley 27 can be determined.

Because a failure determination is executed when the displacement angle of the intake-side cam shaft 23 is at the maximum delay-angle displacement angle, the difference between the determination displacement angle A and the structural displacement angle of 30 degrees CA does not become so large. Therefore, the first predetermined value e can take a small value.

When the intake-side cam shaft 23 is at another predetermined target displacement angle, the difference between the determination displacement angle A and the structural displacement angle of 30 degrees CA becomes greater than that in the previous case. Therefore, the first predetermined value e should take such a value as about 11 degrees CA, for example.

When determining that the difference between the determination displacement angle A and the structural displacement angle of 30 degrees CA is equal to or greater than the first predetermined value e (YES in S3600), the ECU 70 determines that there is a failure such as the misengagement or skipping of teeth between the timing belt 35 and the intake-side timing pulley 27. Then, the ECU 70 sets a valve timing fail flag XVTF in the next step S3700 and returns to the main routine from this subroutine.

Consequently, each control amount that is affected by the valve timing fail flag XVTF is changed to a predetermined control amount. Also, an abnormality indicator on the meter panel, for example, is lit.

When determining that the difference between the determination displacement angle A and the structural displacement angle of 30 degrees CA is smaller than the first predetermined value e (NO in S3600), the ECU 70 determines that there is no failure such as the misengagement or skipping of teeth between the timing belt 35 and the intake-side timing pulley 27. Thus, the ECU 70 returns to the main routine from this subroutine without setting a valve timing fail flag XVTF.

As specifically described above, the abnormality detecting apparatus VC for an engine having a variable valve timing mechanism according to the third embodiment is designed to compute the determination displacement angle A by subtracting the amount of the displacement angle between the reference displacement angle (maximum delay-angle displacement angle) of the intake-side cam shaft 23 and the target displacement angle VTT from the correct real displacement angle VT.

This abnormality detecting apparatus VC is also designed to detect an abnormality (valve timing failure) of the displacement angle of the intake-side cam shaft 23 with respect to the crankshaft 14 when the difference between the determination displacement angle A and the structural displacement angle of 30 degrees CA is equal to or greater than the first predetermined value e. The valve timing failure is originated from, for example, the misengagement or skipping of teeth between the timing belt 35 and the intake-side timing pulley 27. Even when the intake-side cam shaft 23 is shifted to a displacement angle different from the reference displacement angle by the VVT 50 and the timing of the cam angle signal (displacement timing signal) with respect to the crank angle signal (reference timing signal) is altered, therefore, a valve timing failure can be detected without being influenced by the shifting of the intake-side cam shaft 23.

The abnormality detecting apparatus VC is also designed to detect a valve timing failure when the intake-side cam shaft 23 is held at the predetermined target displacement angle VTT. Accordingly, the timing of generating the displacement timing signal with respect to the reference timing signal does not sequentially change during the detection of a valve timing failure, so that a valve timing failure can be detected accurately.

Further, the maximum delay-angle displacement angle is used as the predetermined target displacement angle VTT for determining if the intake-side cam shaft 23 is controlled and held properly. When the VVT 50 is achieving the maximum delay-angle displacement angle, the ring gear 59 abuts on the housing 56 and the action of the ring gear 59 is physically restricted, thus allowing the intake-side cam shaft 23 to be stably held.

Even in computing the correct real displacement angle VT, the determination displacement angle A and the like, computation errors are suppressed so that the precision in the detection of a valve timing failure can be improved further.

The advantages obtained by steps S1000 and S2000 are equivalent to those obtained by steps S30 and S40 in the first and second embodiments.

Although only three embodiments of the present invention have been described herein, it should be apparent to those skilled in the art that the present invention may be embodied in many other specific forms without departing from the spirit or scope of the invention. Particularly, it should be understood that this invention may be embodied in the following forms.

In the above-described embodiments, the VVT 50 uses the mechanism that alters the valve timing of the intake valve 21 by changing the rotational phase of the intake-side cam shaft 23 to the crankshaft 14 by hydraulic pressure. The rotational phase of the intake-side cam shaft 23 with respect to the crankshaft 14 may however be changed by another driving means like a stepping motor. This is because that the VVT 50 designed to change the displacement angle of the intake-side cam shaft 23 with respect to the crankshaft 14 can change the valve timing of the intake valve 21 and a failure may occur by the engagement with a foreign matter or the like. Further, because the timing of generating the displacement timing signal with respect to the reference timing signal, it is necessary to detect a valve timing failure without any influence of a change in the generation timing for the displacement timing signal.

The above-described embodiments have structures to alter the valve overlapping period by variably controlling the valve timing of the intake valve 21. The valve overlapping period may however be changed by variably controlling the valve timing of the exhaust valve 31 or variably controlling the valve timings of both the intake valve 21 and the exhaust valve 31. The valve overlapping period is changed in either case, so that the modification, whichever selected, should be employed to provide the desired engine characteristics.

Furthermore, a failure in the VVT 50 is determined based on the absolute value of the difference between the correct real displacement angle VT, obtained by correcting the real displacement angle VTB, detected by the cam angle sensor 44, with the maximum delay-angle learning value GVTFR, and the target displacement angle VTT in the above-described embodiments. However, other detection schemes may be employed so long as the displacement angle of the intake-side cam shaft 23 with respect to the crankshaft 14 can be detected. Although the real displacement angle VTB, detected by the cam angle sensor 44, is corrected with the maximum delay-angle learning value GVTFR, the correction may be executed based on the absolute value of the difference between the real displacement angle VTB and the target displacement angle VTT for the VVT 50 which does not learn the maximum delay angle. In this case, erroneous failure determination, which may be originated from not learning the maximum delay angle, is eliminated.

Although whether the function of the VVT 50 is unstable is determined based on the coolant temperature THW and the engine speed NE in the above-described embodiments, different determination elements may be used as well.

Although the above-described embodiments use the engine 10 equipped with the cam angle sensor 44 and the timing sensor 42 independently in the above-described embodiments, it is possible to use an engine which shares the cam angle sensor 44 as the timing sensor 42 in order to reduce the number of components. In this case, a timing failure for the timing sensor signal as well as a timing failure for the displacement timing signal can be detected.

Although the correct real displacement angle VT, obtained by correcting the real displacement angle VTB, detected by the cam angle sensor 44, with the maximum delay-angle learning value GVTFR is used, the real displacement angle VTB may be used in the case where the VVT 50 does not learn the maximum delay angle. A valve timing failure may occur even in this case, so that the use of this invention can ensure the accurate detection of a valve timing failure.

Therefore, the present examples and embodiments are to be considered as illustrative and not restrictive and the invention is not to be limited to the details given herein, but may be modified within the scope of the appended claims.

What is claimed is:

1. An abnormality detecting apparatus for detecting an abnormality of an internal combustion engine, wherein said engine includes a crankshaft, an intake port, a corresponding intake valve, an exhaust port, and a corresponding exhaust valve, wherein said valves are driven in a predetermined timing relationship with respect to the crankshaft, wherein said intake valve and exhaust valve selectively open or close the intake port and exhaust port, respectively, and the valve timing of at least one of the intake valve and exhaust valve is altered by a variable valve timing mechanism, said abnormality detecting apparatus comprising:

means for detecting running conditions of the internal combustion engine, an intake cam shaft rotated by a transferring rotational movement means in a predetermined timing relationship with the rotation of the crankshaft, wherein said intake cam shaft drives said intake valve, an exhaust cam shaft rotated by said transferring rotational movement means in a predetermined timing relationship with the rotation of the crankshaft, wherein said exhaust cam shaft drives said exhaust valve, and wherein at least one of said cam shafts is controlled by the variable valve timing mechanism, means for generating a reference timing signal at predetermined crank angle intervals with rotation of said crankshaft, means for deciding a target displacement angle of said cam shaft controlled by said variable valve timing mechanism in accordance with said engine conditions, means for generating an alter timing signal with regard to a real displacement angle of rotation of said cam shaft controlled by said variable valve timing mechanism, wherein said variable valve timing mechanism shifts a displacement angle of said controlled cam shaft with respect to said crankshaft from a reference displacement angle to the target displacement angle so that said valve timing changes from a reference timing to a target timing, means for computing the real displacement angle of said controlled cam shaft with respect to said crankshaft, wherein said displacement angle computing means computes the real displacement angle based on said generated reference timing signal and generated alter timing signal, means for controlling said variable valve timing mechanism to converge said computed real displacement angle to said determined target displacement angle, means for computing an alter amount of said displacement angle based on said computed real displacement angle and the reference displacement angle of said variable valve timing mechanism, means for deciding whether said displacement angle of said controlled cam shaft is held at the predetermined target displacement angle, and means for detecting generation of an abnormality in said engine, wherein said abnormality generation detecting means decides that an abnormality has been generated in said engine when said means for deciding whether the displacement angle is held decides that the displacement angle of said controlled cam shaft remained at said target displacement angle and an absolute difference between said computed real displacement angle and computed alter amount of displacement angle is at least a predetermined value.

2. The abnormality detecting apparatus as set forth claim 1, wherein said predetermined target displacement angle used by said means deciding whether the displacement angle is held corresponds to a maximum displacement of said variable valve timing mechanism.

3. The abnormality detecting apparatus as set forth claim 1, wherein said means deciding whether the displacement angle is held decides that the displacement angle of said controlled cam shaft is held at said target displacement angle when the absolute difference between said decided target displacement angle and said computed real displacement angle is at least a second predetermined value and said computed alter amount of said displacement angle is at most a third predetermined value.

4. The abnormality detecting apparatus as set forth claim 3, wherein said predetermined target displacement angle used by said means deciding whether the displacement angle is held corresponds to a maximum displacement of said variable valve timing mechanism.

* * * * *

UNITED STATES PATENT AND TRADEMARK OFFICE
CERTIFICATE OF CORRECTION

PATENT NO. : 5,715,779
DATED : February 10, 1998
INVENTOR(S) : Senji Kato, et. al.

It is certified that error appears in the above-indentified patent and that said Letters Patent is hereby corrected as shown below:

| Column | Line | |
|--------|------|---|
| 16 | 40 | Change "relay-angle" to --delay-angle--. |
| 18 | 17 | Change "+ime To" to -- +ime T. --. |

Signed and Sealed this

Thirtieth Day of June, 1998

Attest:

BRUCE LEHMAN

Attesting Officer      Commissioner of Patents and Trademarks